United States Patent [19]

Tazaki et al.

[11] 4,345,263

[45] Aug. 17, 1982

[54] RECORDING APPARATUS

[75] Inventors: Shigemitsu Tazaki, Matsudo; Hiroshi Kyogoku, Kawasaki, both of Japan

[73] Assignee: Canon Kabushiki Kaisha, Tokyo, Japan

[21] Appl. No.: 183,948

[22] Filed: Sep. 4, 1980

[30] Foreign Application Priority Data

Sep. 10, 1979 [JP] Japan ................................ 54-115994

[51] Int. Cl.³ ............................................ G01D 15/18

[52] U.S. Cl. ................................ 346/140 R; 346/75; 400/322; 400/126

[58] Field of Search ................ 346/140 R, 139 C, 75; 400/126, 322; 318/135

[56] References Cited

U.S. PATENT DOCUMENTS

| | | | |
|---|---|---|---|
| 4,012,676 | 3/1977 | Giebler | 318/135 |
| 4,138,688 | 2/1979 | Heard | 346/75 |

OTHER PUBLICATIONS

Bishop et al., Carrier Reference Determination for Ink Jet Printers; IBM TDB vol. 21, No. 12, May 1979.

*Primary Examiner*—Joseph W. Hartary
*Attorney, Agent, or Firm*—Fitzpatrick, Cella, Harper & Scinto

[57] ABSTRACT

A recording apparatus having an ink jet station for printing in two directions during movement of a carriage by a linear motor, and a device for eliminating distortion in printing. .

2 Claims, 31 Drawing Figures

RECORDING APPARATUS

BACKGROUND OF THE INVENTION

1. Field of the Invention

The present invention relates to a recording apparatus in which an ink jet head is moved at a high speed with a linear motor, and more particularly to such a recording apparatus with printing speed improved.

2. Description of the Prior Art

The conventional ink jet recording apparatus utilizing a linear motor such as disclosed in the U.S. Pat. No. 4,012,676 can only be utilized in one-directional printing as a distortion in two-directional printing is unavoidable due to the absence of means for eliminating such a distortion, and for this reason it has been difficult to increase the printing speed.

SUMMARY OF THE INVENTION

An object of the present invention is to provide an ink jet recording apparatus utilizing a linear motor and capable of two-directional printing without distortion in printing as observed in the conventional technology.

BRIEF DESCRIPTION OF THE DRAWINGS

FIG. 6A, and FIGS. 6B-1 and 6B-2, when combined as shown in FIG. 6B are waveform charts showing the printing operations;

DESCRIPTION OF THE PREFERRED EMBODIMENT

Figure 1:
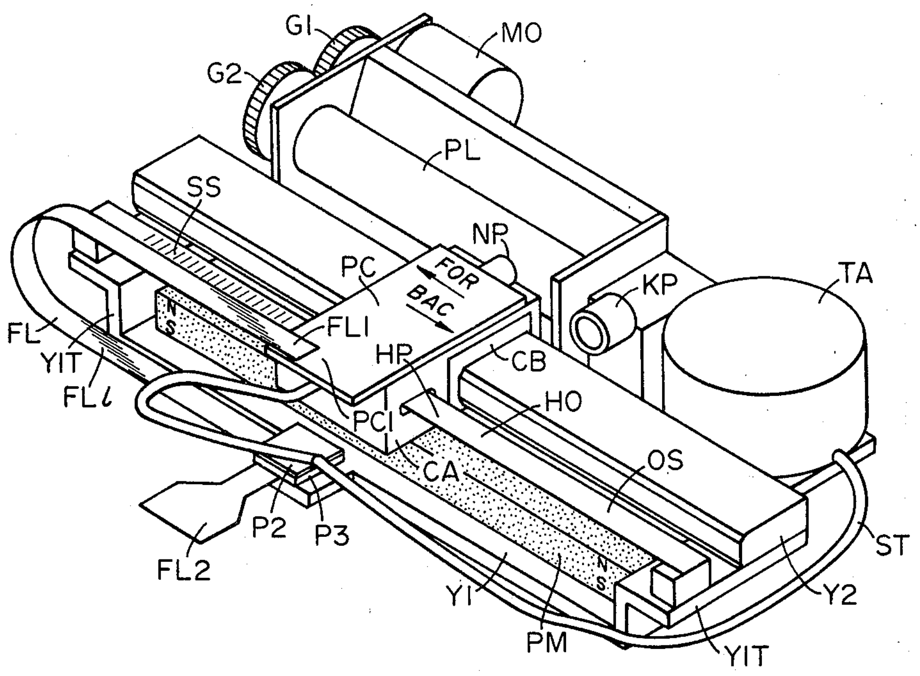
FIG. 1 is a perspective view of an embodiment of recording apparatus in accordance with the present invention.
Figure 2:
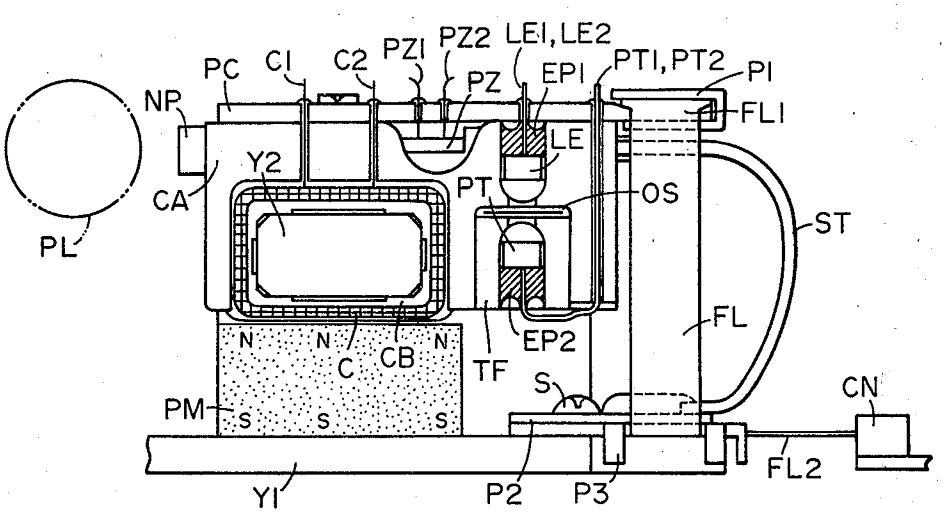
FIG. 2 is a cross-sectional view of the apparatus shown in FIG. 1.

Now the present invention will be clarified in detail by the following description of an embodiment with reference to a perspective view of FIG. 1 and a cross-sectional view of FIG. 2, wherein a carriage CA supporting a recording head, such as an ink jet nozzle head NP, is driven by a linear motor.

The linear motor is provided with a closed magnetic circuit composed of a permanent magnet PM, a magnetic plate Y1 and a magnetic guide member Y2. A coil C wound on a coil bobbin slidably mounted on guide member Y2 is energized with an electric current to drive the carriage CA which is integral with coil bobbin CB, according to the Fleming's left-hand law. The reciprocating motion of the carriage on the guide member Y2 is caused by inverting the direction of the current supplied to the coil C. A graduation plate for example composed of a non-magnetic optical slit plate OS is horizontally fixed, together with the guide member Y2, to bent end portions Y1T of the magnetic plate Y1 so as to be parallel to guide member Y2. The carriage CA is provided thereon with the coil bobbin CB for the coil C, an ink jet nozzle NP, slit detecting means for example composed of a light-emitting diode LE and a phototransistor PT and fixed in position by adhesives EP1, EP2, and a printed circuit board PC. Printed circuit board PC is electrically and mechanically connected to the terminals C1, C2 of the coil C, terminals PZ1, PZ2 of a piezoelectric element PZ for driving the ink jet nozzle, terminals LE1, LE2 of the light-emitting diode LE and terminals PT1, PT2 of the phototransistor PT. All the signal lines are connected to an end FL1 of a flexible cable FL supported by a fixing plate P1. The flexible cable FL is folded back in the middle thereof and fixed by a fixing plate P2 and a cable fixing plate P3 maintained in position by a screw S where an ink supply tube ST for ink supply from a tank TA is also fixed by fixing plate P2. The other end FL2 of flexible cable FL is connected to a connector CN shown in FIG. 2 for driving the carriage CA and controlling the piezoelectric element PZ of the ink jet nozzle NP through the signal lines in flexible cable FL. The optical slit plate OS is positioned between the light-emitting diode LE and the phototransistor PT. Along with the movement of the carriage, the infrared light emitted by the light-emitting diode LE is received through slits SS by receiving slit (not shown) of the same dimension mounted on the phototransistor PT to cause repeated on and off actions thereof, thereby generating timing pulses TP, which are utilized for detecting the speed and position of the carriage CA in the scanning motion and controlling the speed and function of the ink jet nozzle NP and a paper feed stepping motor PM. In the printing of a line, the characters are composed of dots in a matrix form. After the carriage is put into scanning motion, the position thereof is detected by timing pulses, and the piezoelectric element of the ink jet nozzle is energized at determined positions to cause emissions of ink droplets thereby performing the printing a dot line on recording paper (not shown). Upon completion of one dot line the paper feed stepping motor MO is rotated by a dot pitch and the carriage CA is returned to its original position. The paper feeding is achieved by rotation transmitted from the stepping motor through a motor shaft gear (not shown) and a gear G1 to another gear G2 fixed on the shaft of the platen PL to perform paper feeding in the vertical direction. Upon completion of the printing of dot lines of a determined number, for example 7 dot lines, by the repetition of the above-mentioned procedure, the platen PL is rotated by a determined interline space by the stepping motor MO, thus completing the printing of a line. Thereupon the ink jet nozzle NP is transferred to and stopped at a position HO of a cap KP for preventing the clogging, drying and meniscus retraction in the ink jet nozzle.

As explained in the foregoing, the apparatus of the present invention can be realized in a small, thin and simple structure without perturbation in the magnetic field as the carriage guide member and the non-magnetic slit plate are positioned in parallel to the magnetic plate of the permanent magnet.

Also the recording apparatus in accordance with the present invention is very much quiet since the carriage drive is achieved without a rotary motor and thus without gears, links, racks, etc., and the paper feeding is achieved without ratchet, plunger, etc.

Furthermore the sliding contact of the carriage with the slit plate eliminates the ink eventually deposited thereon, thus preventing the malfunction of the slit detecting means consisting of the light-emitting device and the photodetector.

Furthermore the use of the printed circuit board supporting various electric components and mounted on the carriage enables easy and inexpensive manufacture, and the use of the flexible cable allows free movement and permits simple fixation with the ink supply tube.

Figure 3:
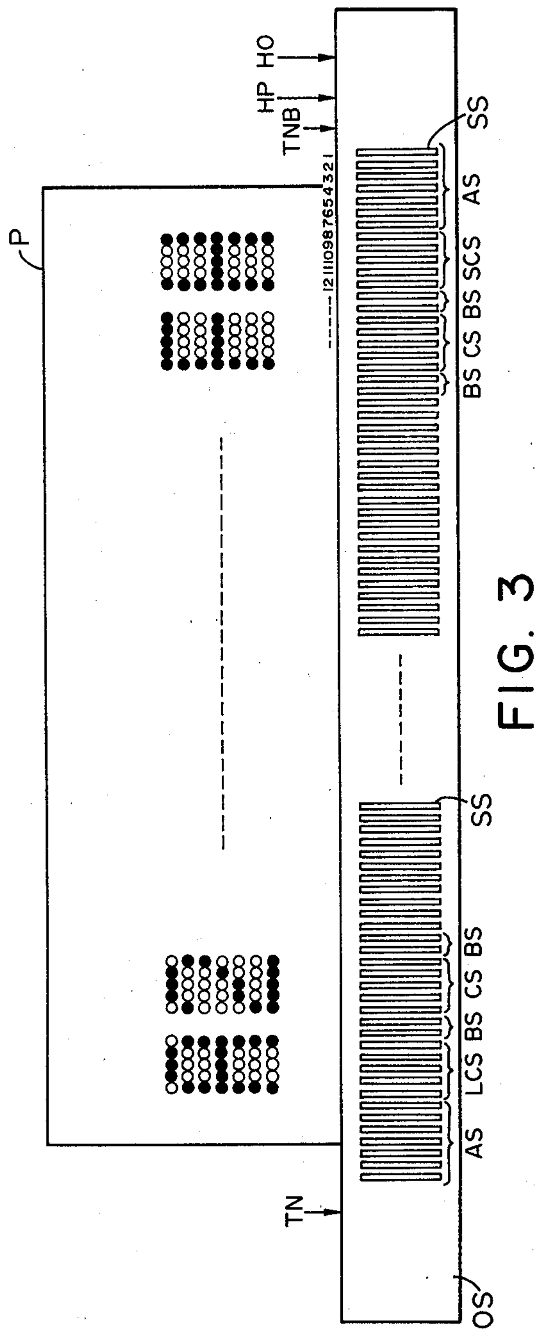
FIG. 3 is a magnified view of the slit plate involved in the apparatus.

In the foregoing embodiment the optical slit plate OS is provided with slits SS as shown in FIG. 3 for achieving positional detection and constant speed control.

Slits SS are provided over the entire width of the recording paper P, and the speed control of the carriage CA is completed, after its start from the initial position HP or HO, before counting 8 slits SS. The printing of the first digit is initiated at the eighth slit and is completed over five slits from 8th to 12th, succeeding two slits 13 and 14 serving as a blank between characters, and the printing operation is repeated in this manner. AS, CS and BS respectively represent approach slits for detecting the print start position, character slits and blank slits, the slit and spaces thereof also serving for realizing a constant movement speed of the carriage.

FIGS. 4A–4D show an embodiment of the control circuit for the recording apparatus, wherein lead wires FF, FB, FV, FT, FP and FE are integrally formed in a flexible cable FL shown in FIG. 1 to facilitate the movement of the carriage CA. Upon turning on of the power supply in FIGS. 4A–4D, a control unit CC maintains a signal line l2 at its "0" level for a determined period to reset a flip-flop F1 and a speed control SC, to clear a print position counter PC, a line counter 7C, a timing pulse separating circuit TB and a backward counter BC through a gate AR, to activate a one-shot multivibrator OS, and to supply a "1" level signal over a signal line lR to a gate ST.

Also in order to transfer the carriage CA to its initial position HO (FIG. 5), signal levels on lines lF, lB for driving the coil C are respectively shifted to "0" and "1", thereby driving the carriage CA in the backward direction toward the initial position.

Figure 5A:
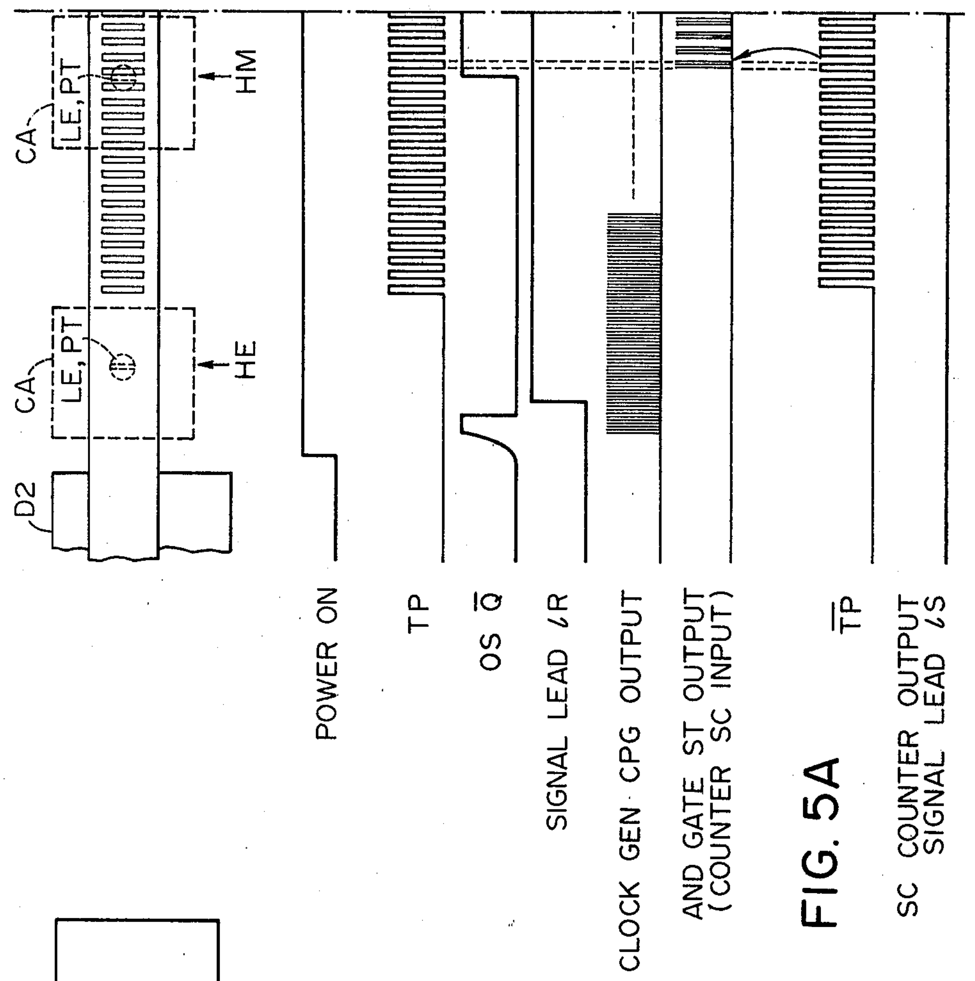
FIGS. 5A and 5B, when combined as shown in FIG. 5, show waveforms useful for understanding position determining operations of the apparatus.
Figure 5:
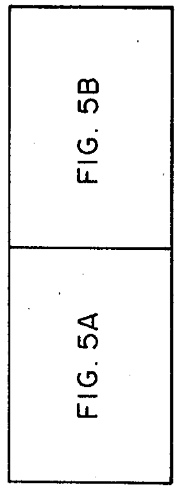
Figure 5B:
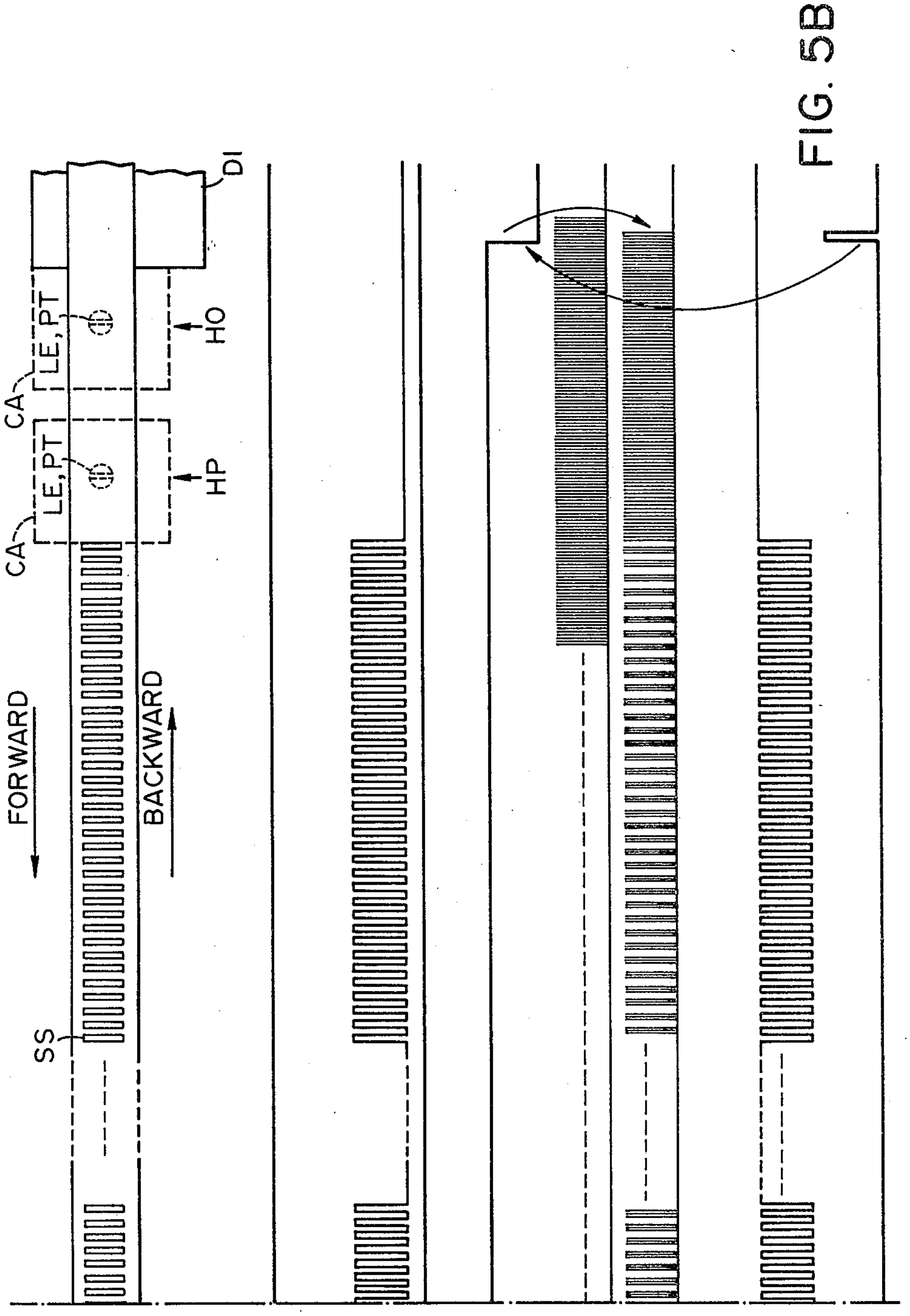

The operative time of the one-shot multivibrator OS is so selected as to enable the carriage movement for example to a position HM, as shown in FIG. 5, even when the carriage is initially located at the left-end position.

Figure 4:
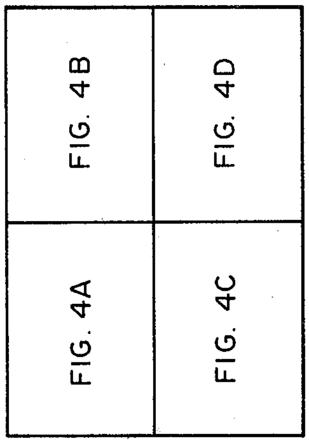
FIGS. 4A–4D, when combined as shown in FIG. 4, are a schematic block diagram of an exemplary control system of the apparatus.
Figure 4A:
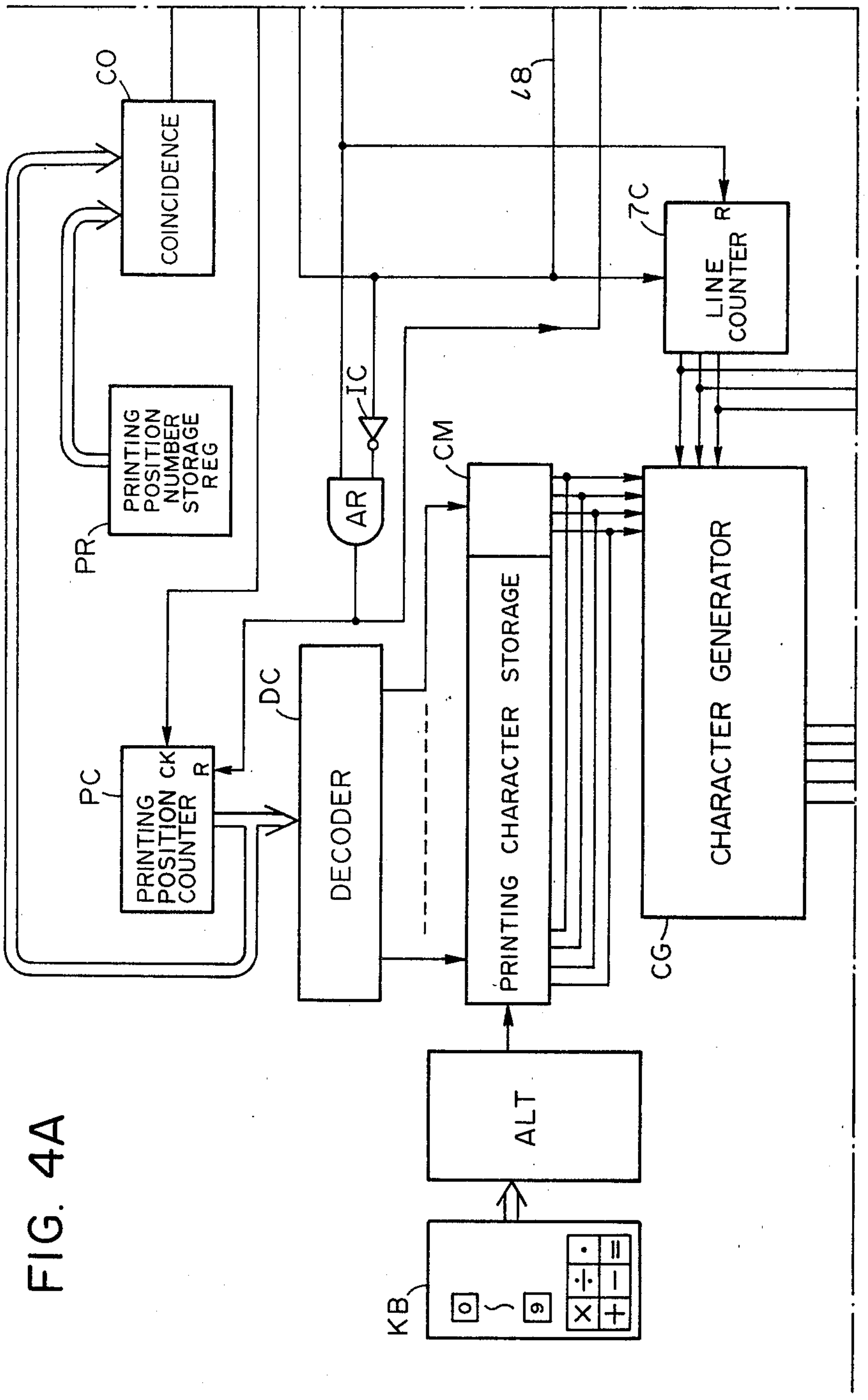
Figure 4B:
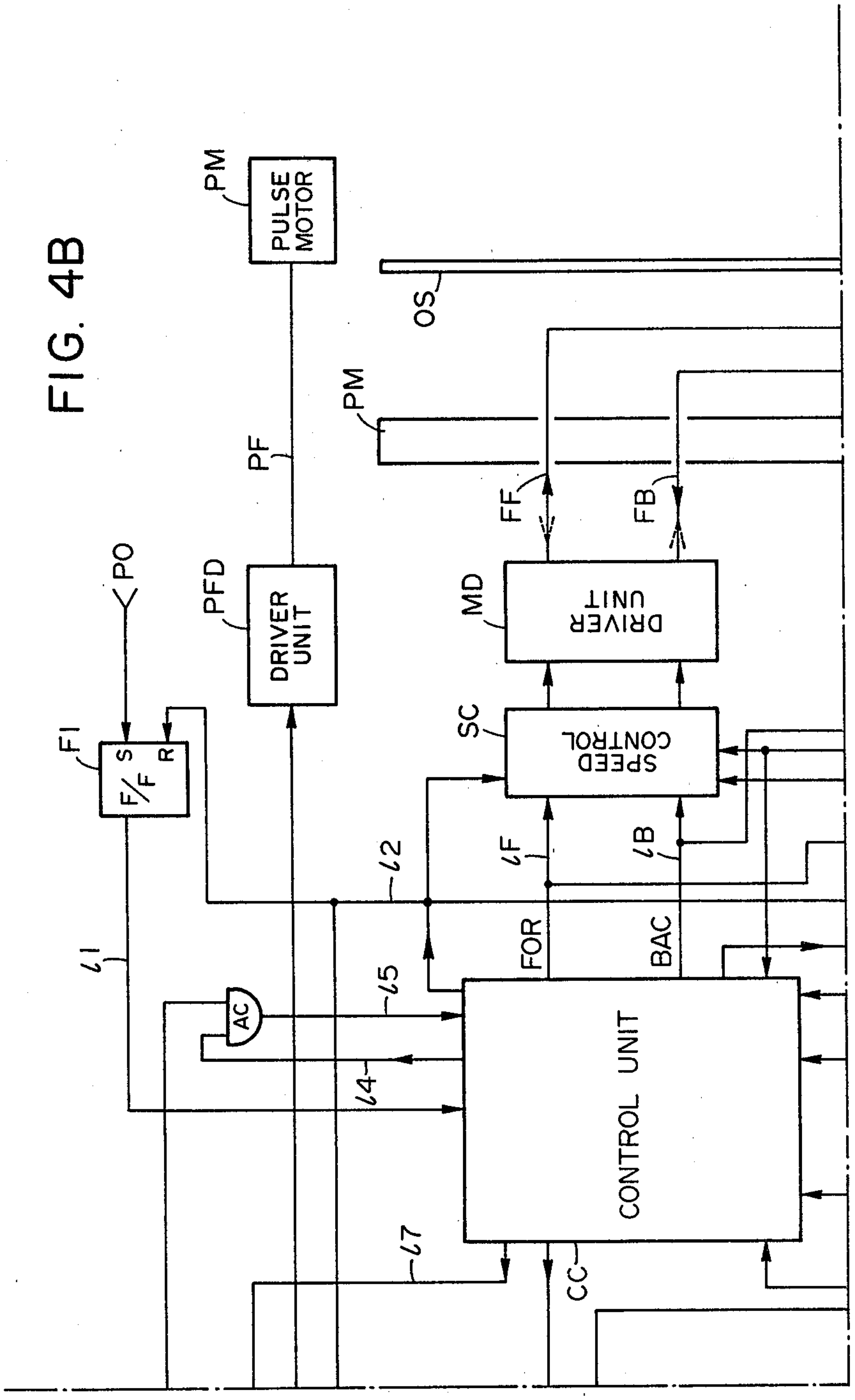
Figure 4C:
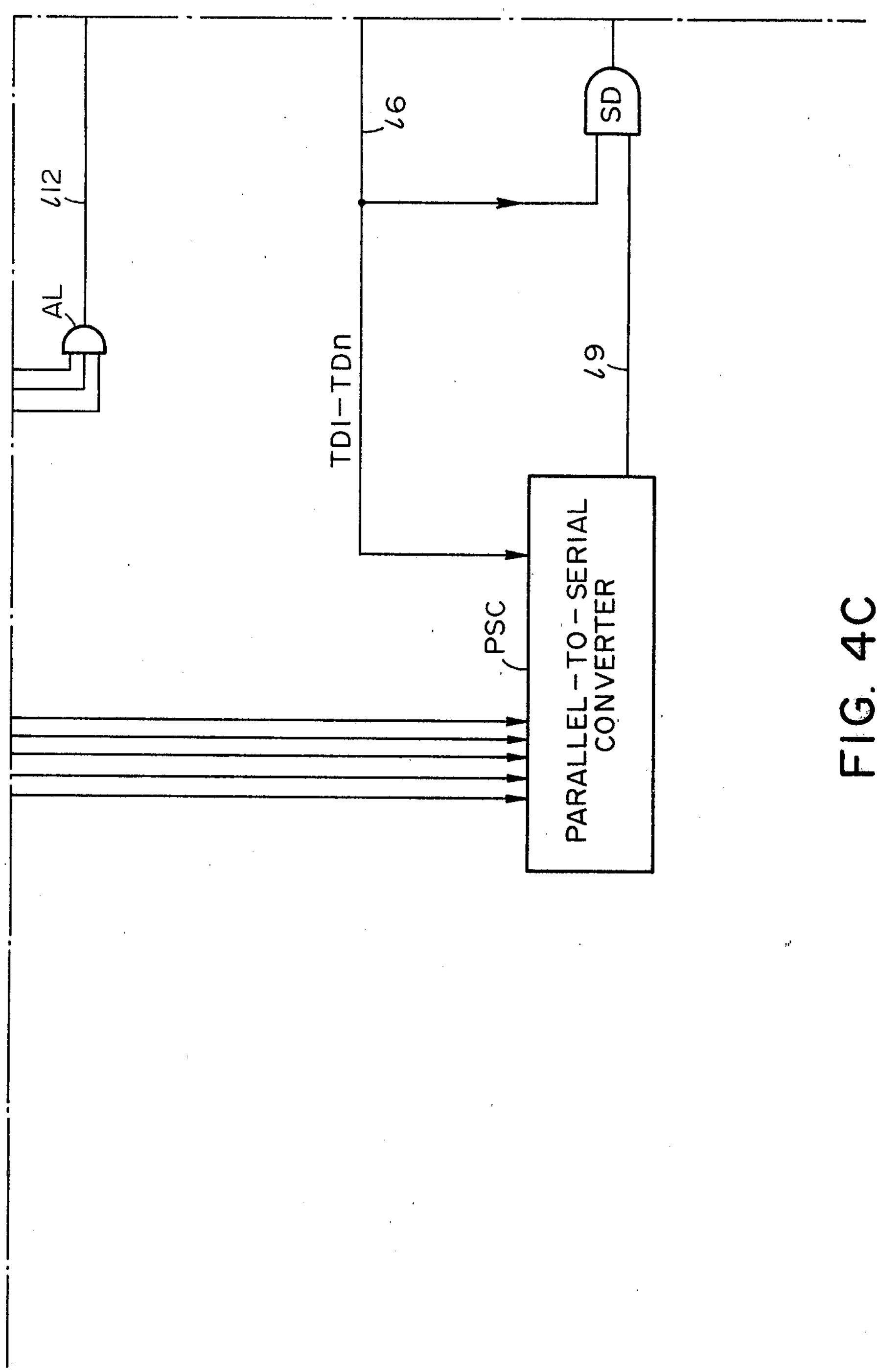
Figure 4D:
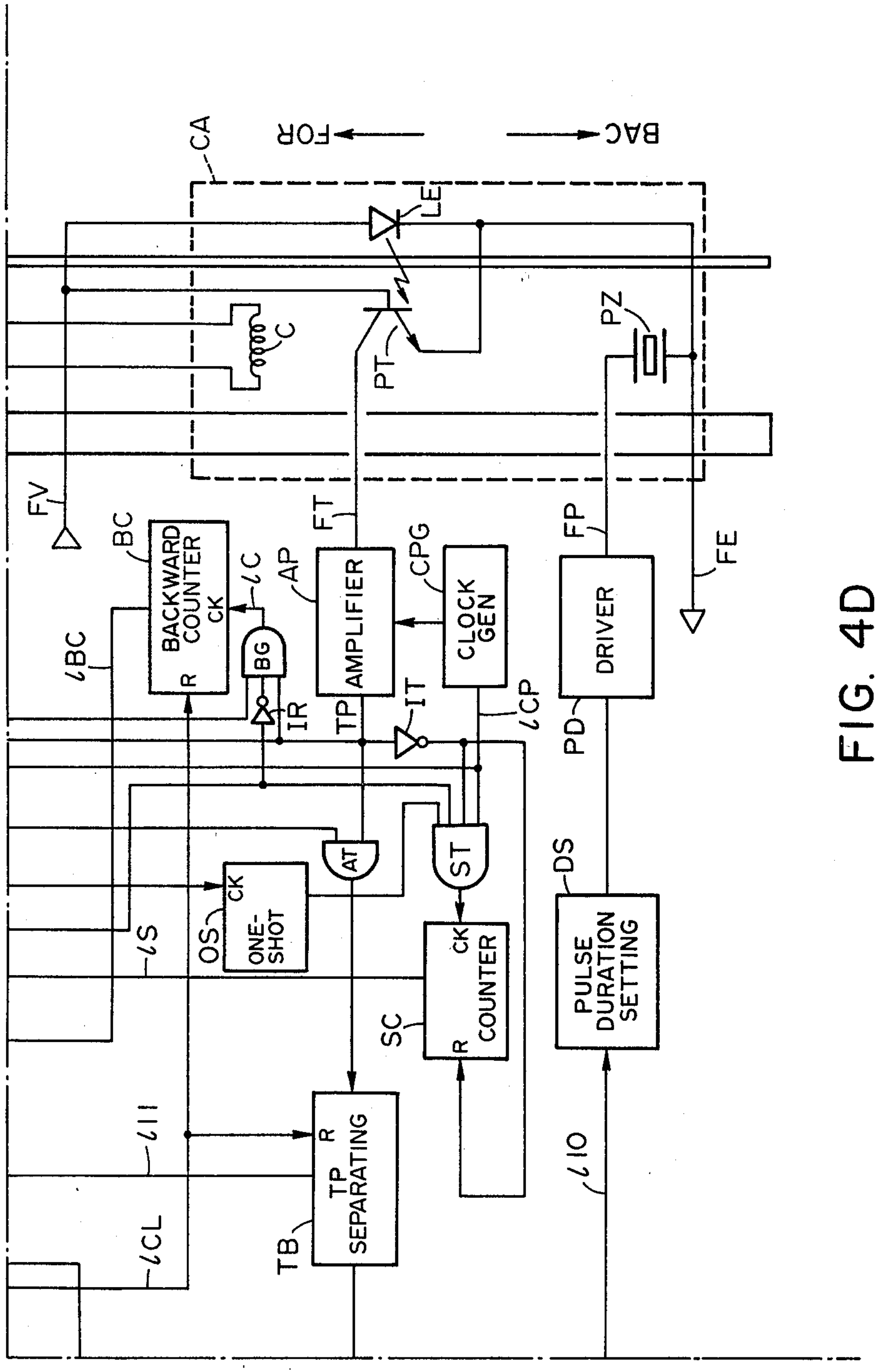

In response to the above-mentioned carriage drive from a carriage position HE shown in FIG. 5, the light received through the slits SS is supplied to an amplifier AP shown in FIG. 4 to develop timing pulses TP over a signal line lT, the timing pulses being inverted into signals $\overline{TP}$ by an inverter iT and supplied to the gate ST, which however is closed during the operative time of the one-shot multivibrator OS to inhibit the entry of the timing pulses TP and the output signals from a clock pulse generator CPG into the counter SC during the operative time period.

In the meantime the carriage is moved from HE to HM, and after the operative time of the one-shot multivibrator OS, the output signals from the clock pulse generator are introduced into the counter SC only during the presence of the signal $\overline{TP}$.

Figure 6A:
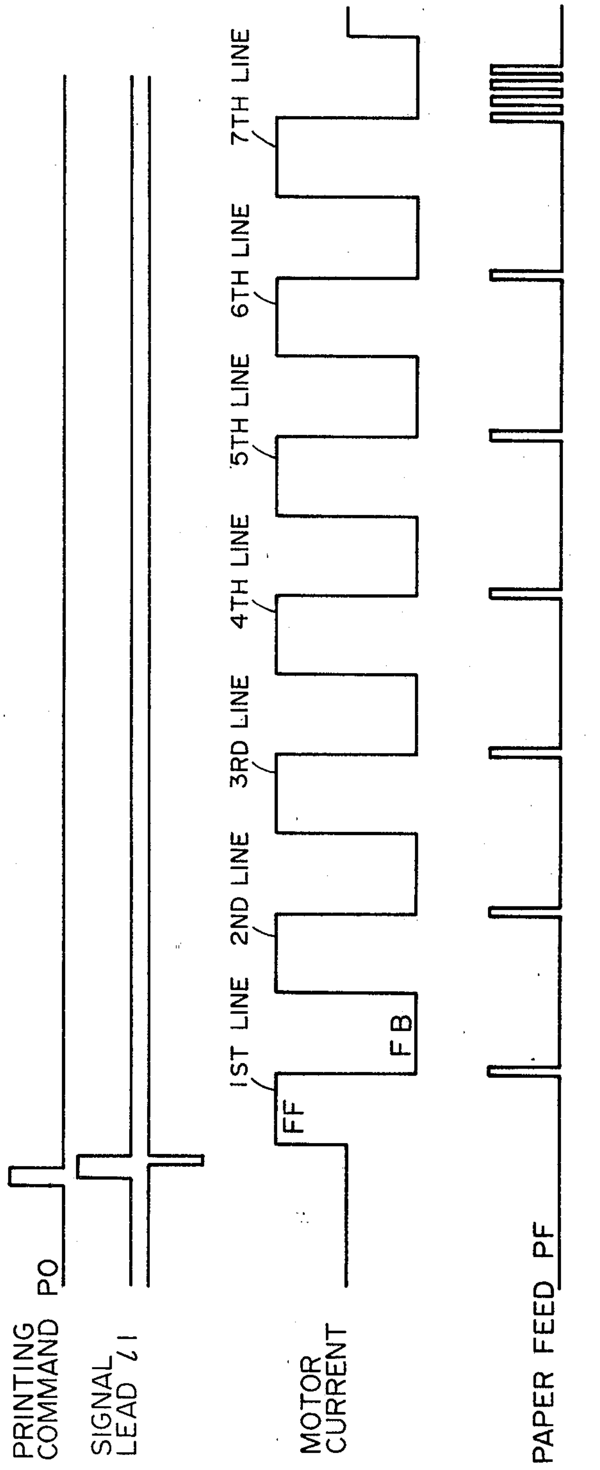

However the counter SC does not produce the output signal during the passage of the carriage CA over the translucent slits SS of the slit plate OS, since counter SC is reset at the trailing edge of each timing pulse $\overline{TP}$. The full-count capacity of counter SC is so selected as to be sufficiently larger than the number of signals received from the clock pulse generator CPG between two succeeding translucent slits and be still larger than, for example as large as about 1.5 times of, the number of signals to be received until the carriage transfer to the position HO, whereby the counter SC produces a signal on a signal line lS at a determined time after the arrival of the carriage at the position HO from the slit area. In response to the signal the control unit CC detects the arrival of the carriage at its initial position and shifts the coil drive signal over line lB to its "0" level to terminate the carriage drive and the signal over line lR to its "0" level to disable the gate ST. Also the input signal to a gate BG through an inverter IR is shifted to its "1" level. In FIG. 5, D1 and D2 represent cushioning members made for example of a foamed material and provided for abating the shock and noise of the collision of carriage. The information to be printed is entered from a keyboard KB through an arithmetic logic unit ALT into a printing character storage CM. In response to a print command signal PO shown in FIG. 6A, the flip-flop F1 is set to shift, over the set output line l1 thereof, the control unit CC to the print operation mode, whereby control unit CC maintains the signal line l2 for a determined period to reset the flip-flop F1 and the speed control SC and to clear the print position counter PC, line counter 7C, backward counter BC and timing pulse separating circuit TB.

The one-shot multivibrator OS is also activated at the same time, but the counter SC is not affected as the gate ST is maintained disabled by the "0" level signal on the line lR. However the gate BG is in its enabled state by the inverter iR. After the resetting and clearing, the control unit CC releases a "1" level signal over a line l4 to open a gate AC, through which and a line l5 received is the output signal from a coincidence circuit CO comparing the contents of the printing position counter PC with a printing position number register (hereinafter abbreviated as printing position register) PR. In the absence of coincidence, the control unit CC shifts a signal line lF level to "1" level to energize the coil C through a driver MP thereby transferring the carriage in the forward direction.

For example in case the contents of the printing position counter PC and the printing position register PR are respectively 0 and n, the coincidence circuit CO produces a non-coincidence signal, in response to which the control unit CC performs the above-explained driving operation.

Figure 6B:
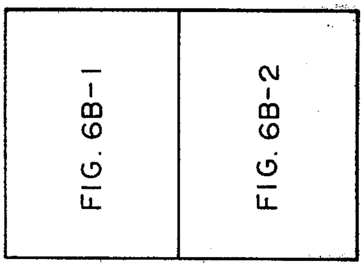
Figures 1, 6B:
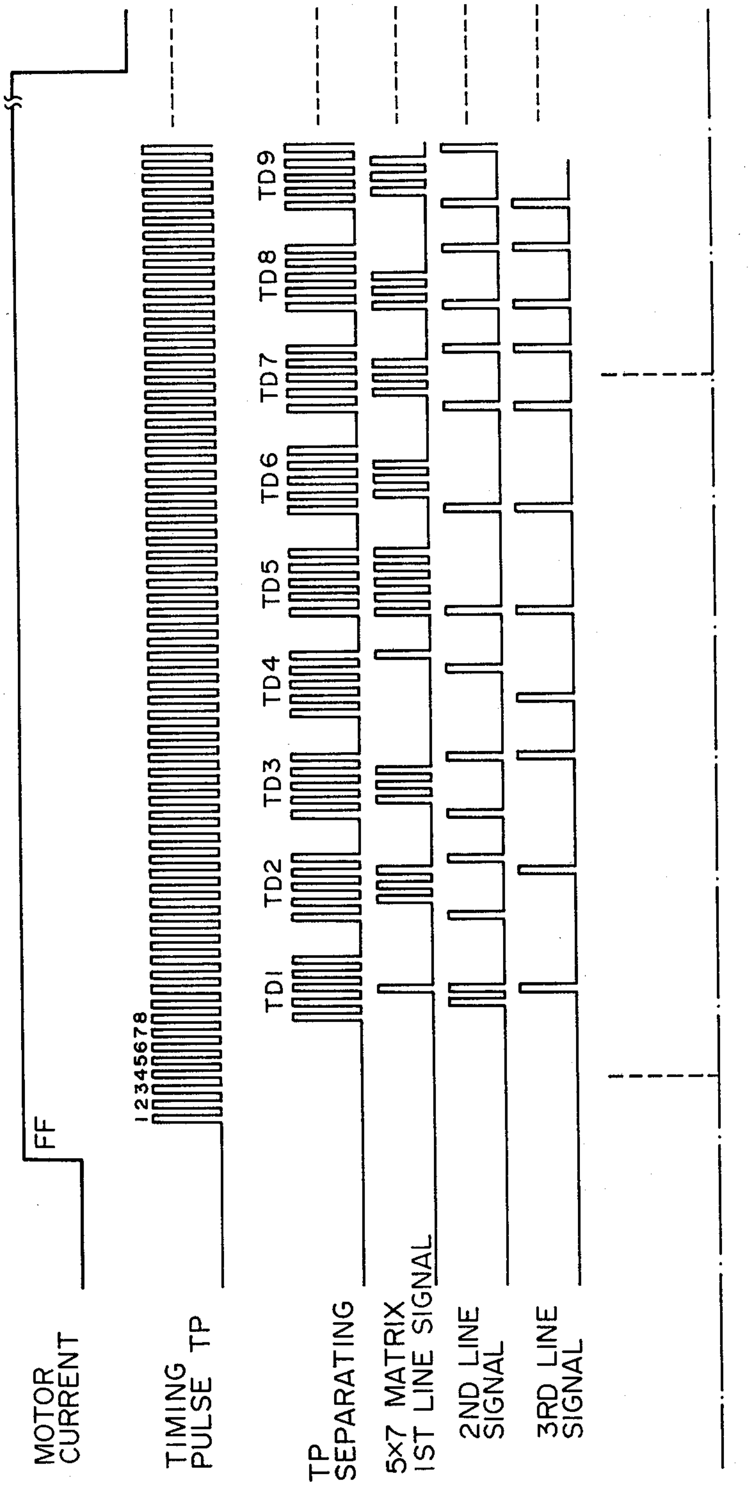
Figures 2, 6B:
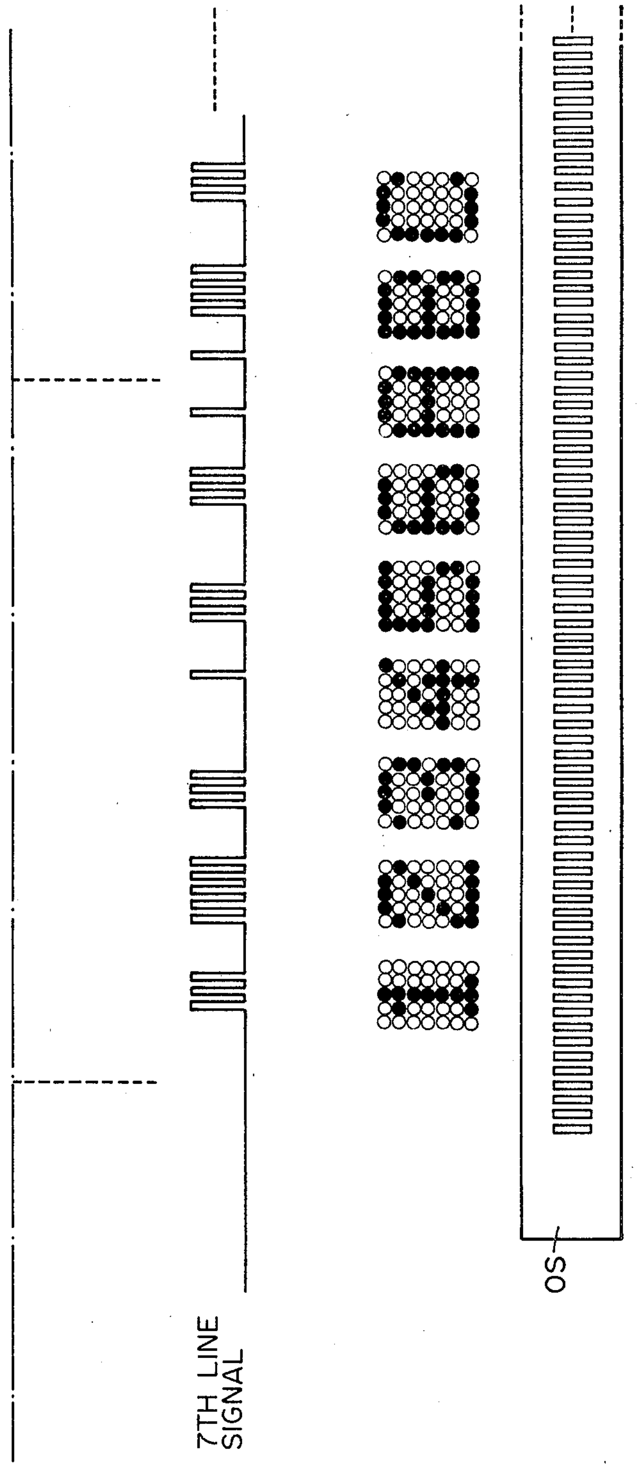

Along with the forward movement of the carriage CA, the detectors LE, PT moves over the slit plate OS to generate timing pulses TP through the amplifier AP. Timing pulses TP are supplied through a gate AT enabled by the "1" level signal on the line lF and divided by the timing pulse separating circuit TB into groups of 5 pulses TDl-TDn for character position printing as shown in FIGS. 6B-1 and 6B-2, of which TD1 is at first supplied on a signal line l6 to a parallel-to-serial converter printing position PSC and to a gate SD.

The number to printing position to be printed in a line is stored in advance in the printing position register PR, while printing positions are counted by the printing position counter PC of which output is received by a decoder DC for selecting the content of the printing character storage CM.

The content thus selected is converted into 5-bit printing signals by a character generator CG, under the control of the line counter 7C.

Figure 7:
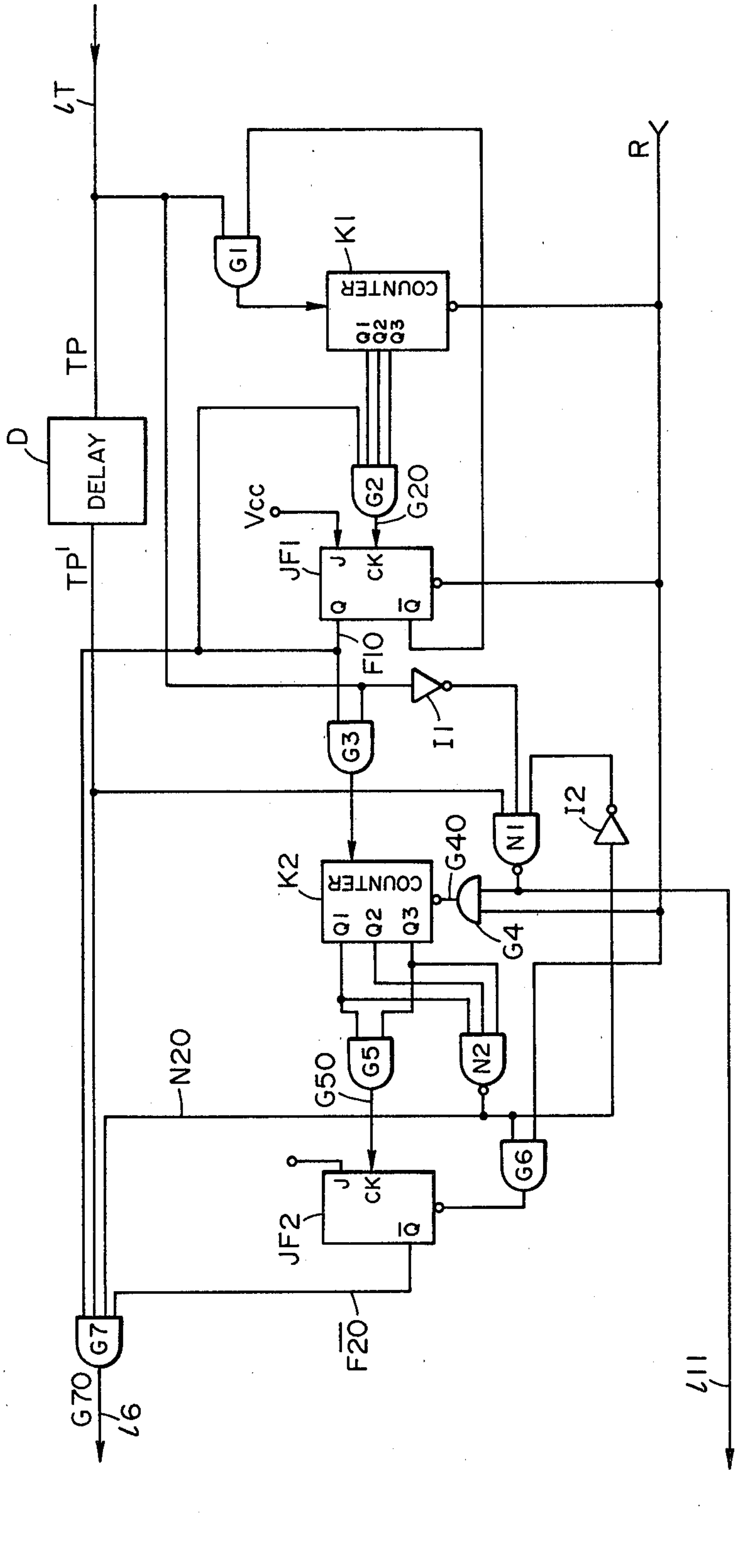
FIG. 7 is a schematic diagram of a part of the circuit of the apparatus.
Figure 8:
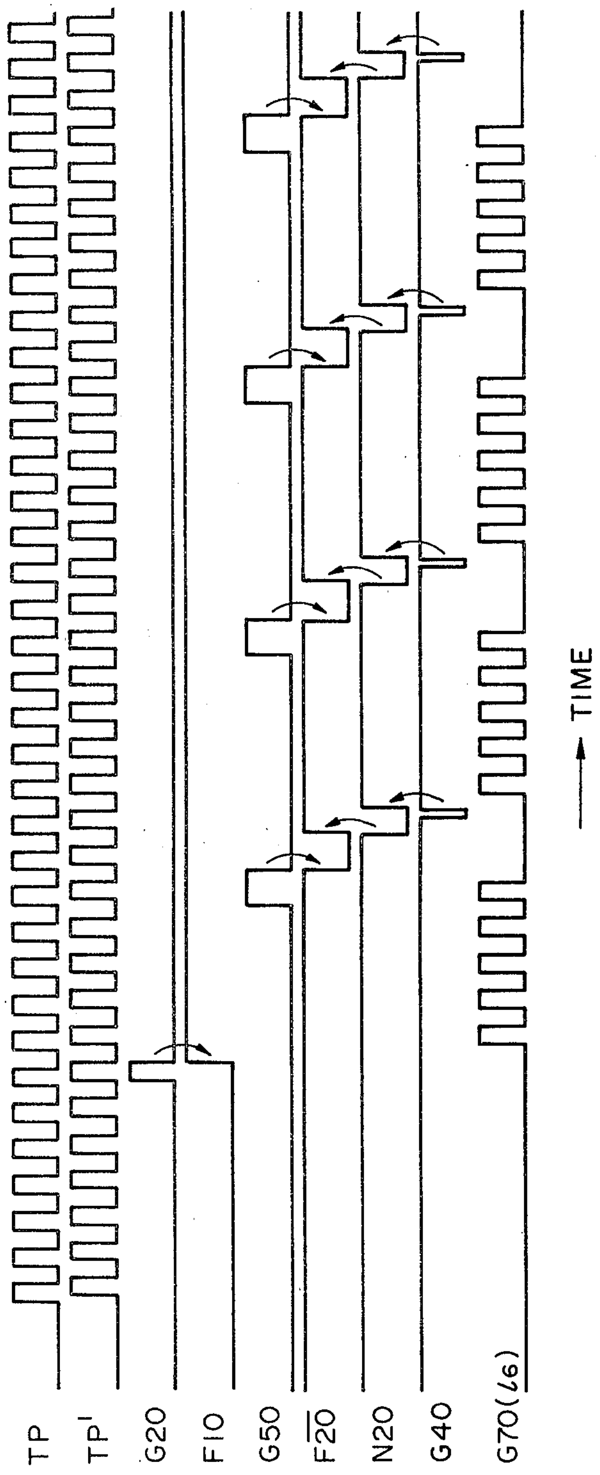
FIG. 8 is a waveform chart showing the operations of the circuit shown in FIG. 7.

The 5-bit print signals are supplied to the parallel-to-serial converting circuit PSC, of which output signals are supplied, on a signal line l9, the gate ST to be enabled only during the "1" level state of the signal TD1 and a signal line l10, to a pulse duration setting circuit DS to produce pulses of a determined duration, thereby activating the piezoelectric device PZ through a piezo driver PD, thus achieving the printing by ink droplet emission in response to the input signals to pulse duration setting circuit DS. The timing pulse separating circuit TB shown in FIG. 4 can be composed, as shown in FIG. 7, of a delay circuit D, counters K1, K2, J-K flip-flops JF1, JF2, AND gates G1-G7, NAND gates N1, N2 and inverters I1, I2 and functions as shown in the timing chart of FIG. 8 to generate the aforementioned signals TD1-TDn on the output line l6.

In the foregoing there has been explained the 5-dot printing in the first line of 7 lines constituting a 5×7 dot matrix corresponding to the first character position of the first printing line. Upon completion of the 5-dot printing which is sensed through a line 11, the control unit CC produces a signal on a line l7 to increment the content of the printing position counter PC. Then, as explained in the foregoing, the gate AC is enabled by the signal on line l4 and the output from the coincidence circuit CO comparing the contents of the printing position counter PC with the printing position register PR is received on the line l5. In case the control unit CC detects the absence of coincidence, a character from the print character storage CM corresponding to the incremented content of the printing position counter PC is printed in response to the 5-pulse signals TD2 from the timing pulse separating circuit TB.

The above-explained procedure of increment of the printing position counter, memory readout and signal entry to the parallel-to-serial converting circuit can be sufficiently executed before the 5-pulse signals since the system clock signals of the circuit are sufficiently faster in rate than the timing pulses. In this manner 5-dot groups constituting the first line in the first printing line are printed in succession. When the control unit CC detects, through line l5 and the gate AC to be enabled by the line l4 signal the output signal from the coincidence circuit CO indicating the coincidence of the contents of the printing position counter PC and the printing position register PR, the control unit CC maintains a signal line l8 at its "1" level for a determined period to activate a paper feed driver unit PFD for feeding the paper, to clear the printing position counter PC, timing pulse separating circuit TB and backward counter BC through the gate AR and to increment the content of the line counter 7C. At the same time the control unit CC detects that the 7th line is not yet reached from the "0" level state of a signal line l12 from a gate AL indicating the logical AND of the output signals from the line counter 7C.

Thus the control unit CC shifts the levels of lines lF, lB, respectively to their "0" and "1" levels to initiate the backward transfer of the carriage, during which the gate BG is enabled by lR=0 and lB=1, thus allowing entry of timing pluses into the backward counter BC over the line lC, whereby backward counter BC counts the timing pulses generated by the slits during the backward movement of the carriage. Upon completion of the counting of all the timing pulses which are sensed on a line lBC, the control unit CC identifies the arrival of the carriage at a position outside the slit area (right end position HP on the slit plates OS in FIG. 5) and the line lB to "0" level to terminate the backward carriage movement. During such backward movement the printing is not conducted as the gate AT is disabled by lF=0 to inhibit entry of the timing pulses to the separating circuit TB.

Subsequently the printing for the succeeding line indicated by the line counter 7C is effected since the control unit CC, as explained before, identifies that the printing of 7th line of 5×7-dot matrices is not completed, as indicated by the line l12.

At this point the content of the line counter 7C has been incremented from "0" to "1", thus indicating the second line in the character generator CG. In a similar manner to explained in the foregoing, the control unit CC shifts the levels of lines lF and lB respectively to their "1" and "0" levels to activate the driver MD, to enable the gate AT and to disable the gate BG. Along with the resulting forward advancement of the carriage, the detectors LE, PT shown in FIG. 2 more along the slits SS to generate timing pulses TP, which are separated into 5-pulse groups TD1–TDn by the separating circuit TB. Also as discussed in the foregoing, the printing character storage CM produces a character of the first digit selected by the output of the printing position counter PC and through the decoder DC, and in turn the character generator CG develops the data for the second line of 5×7-dot matrix under the control of the line counter 7C of which the content is now "1". The data are serially supplied from the parallel-to-serial converting circuit PSC in response to 5-pulse group from the timing pulse separating circuit TB to the pulse duration setting circuit DS, thus driving the piezo driver PD for a determined duration to achieve the printing of the second line of 5×7-dot matrix in the first digit position.

Thereafter the printing of 2nd line of 5×7-dot matrices is conducted for the entire printing position in the similar manner to the first line.

Upon completion of the printing of the 2nd line detected in the same manner by the coincidence circuit CO, the control unit CC executes the paper feed through the line l8, clears the print position counter PC, timing pulse separating circuit TB and backward counter BC and increments the content of the line counter 7C. At this point the control unit CC identifies that the printing of the 7th line of 5×7-dot matrices is not yet completed from the "0" level state of the line l12 from the gate AL as explained in the foregoing, and shifts the levels of lines lF, lB respectively to their "0" and "1" levels, thus reversing the carriage advancement. Then, upon completion of the counting of all the timing pulses to be sensed from the backward counter BC and through the gate BG, the control unit CC terminates the coil drive to stop the carriage at the position HP outside the slit area.

Thereafter the printing of a succeeding line is similarly conducted according to the incremental content of the line counter 7C.

After the completion of printing from 3rd to 7th lines in the same manner, the control unit CC effects the paper feed of one line, clears the print position counter PC, timing pulse separating circuit TB and backward counter BC, and increment the content of the line counter 7C.

At this point the control unit CC identifies the completion of printing of the 7th line in the 5×7-dot matrices by the "1" level signal supplied from the gate AL through the line l12.

Then the control unit CC checks the state of the signal line l1 from the flip-flop F1 to identify the presence or absence of the succeeding print command signal. In the case of the "1" level state indicating the presence of the succeeding printing command signal, the control unit CC thus identifies that the printing is to be continued and shifts the levels of lines lF and lB respectively to their "0" and "1" levels to reverse the carriage movement, thereby returning the carriage to the initial position HP outside the slit area, in the similar manner to the printing of 5×7-dot matrices, utilizing the output signals supplied from the backward counter BC through the gate BG. At the same time the paper feed driver PFD is activated by the line l8 to effect the paper feed three times.

Subsequently the control unit CC stores the information of the succeeding printing line in the printing character storage CM to assume the printing mode for the succeeding line, and maintains, as in the printing of the preceding line, the signal line l2 at its "0" level for a determined period to reset the flip-flop F1 and speed control SC, and to clear the printing position counter PC, line counter 7C, backward counter BC and timing pulse separating circuit TB. At the same time the one-shot multivibrator is activated, but the counter SC is not affected as the gate ST is disabled by the "0" level state of the line lR.

Subsequently the contents of the printing position counter PC and of the print position register PR are compared in the coincidence circuit CO, of which output signal is supplied through the gate AC to be enabled by the line l4 signal and through the line l5. In the absence of coincidence the printing is continued in the same manner until the completion of the printing of the printing line is identified by the signal supplied over the line l12 from the gate AL, indicating the state of the line counter 7C.

The printing is thereafter continued in the similar manner when a continued printing is instructed.

On the other hand, in case the "0" level state of the flip-flop F1, indicating the absence of succeeding printing command signals, is identified through the line l1, the control unit CC returns the carriage CA to a position HO located outside the slit area and the same as at the turning on of the power supply.

The return position HP of the carriage in the course of continued printing is different from return position HO after the completion of the printing operation, because, during continued printing, it is advisable to initiate the forward carriage advancement from the closer position HP in order to minimize the carriage movement time outside the slit area.

Although it is possible to return the carriage always to the position HP, a different position HO may be available for providing the protecting means KP for example for head fixation, capping, cleaning, etc. and for heat recovery after the ink emission is interrupted. At such carriage return to the position HO, the control unit CC maintains, in the similar manner to the turning on of the power supply, the signal on line l2 at its "0" level for a determined period to reset the flip-flop F1 and speed control SC, to clear the printing position counter PC, line counter 7C, timing pulse separating circuit TB and backward counter BC through the gate AR, to activate the one-shot multivibrator OS and to supply the "1" level signal over the line lR to the gate ST, thereby allowing entry of the output signals from the generator CPG into the counter only when the signal $\overline{TP}$ is at its "1" level. In this state the backward counter BC does not operate as the gate BG is disabled through the inverter iR.

Then the control unit CC shifts the levels of lines lF, lB respectively to their "0" and "1" levels to energize the coil C for causing the backward carriage movement, during which the counter SC repeats the counting of pulses from the clock pulse generator CPG and resetting by the on and off states of the timing pulses TP. After the carriage transfer to the position HO shown in FIG. 5, and after the determined counting time, the counter SC produces the output signal on the line lS, by means of which the control unit CC identifies the carriage movement and shift the level of line lB to its "0" level thereby terminating the coil driving and thus stopping the carriage CA at position HO. Also the line lR is shifted in level to its "0" level to enable the gate ST, whereby the gate BG is enabled through the inverter iR. At the same time the paper feed driver PFD is further activated through the signal line l8 to effect the paper feed three times, thus completing the printing operation.

The position HP is the stopping position of the carriage CA by inertial movement after the coil drive is interrupted upon completion of the counting of all the slits by the backward counter BC.

Figure 9:
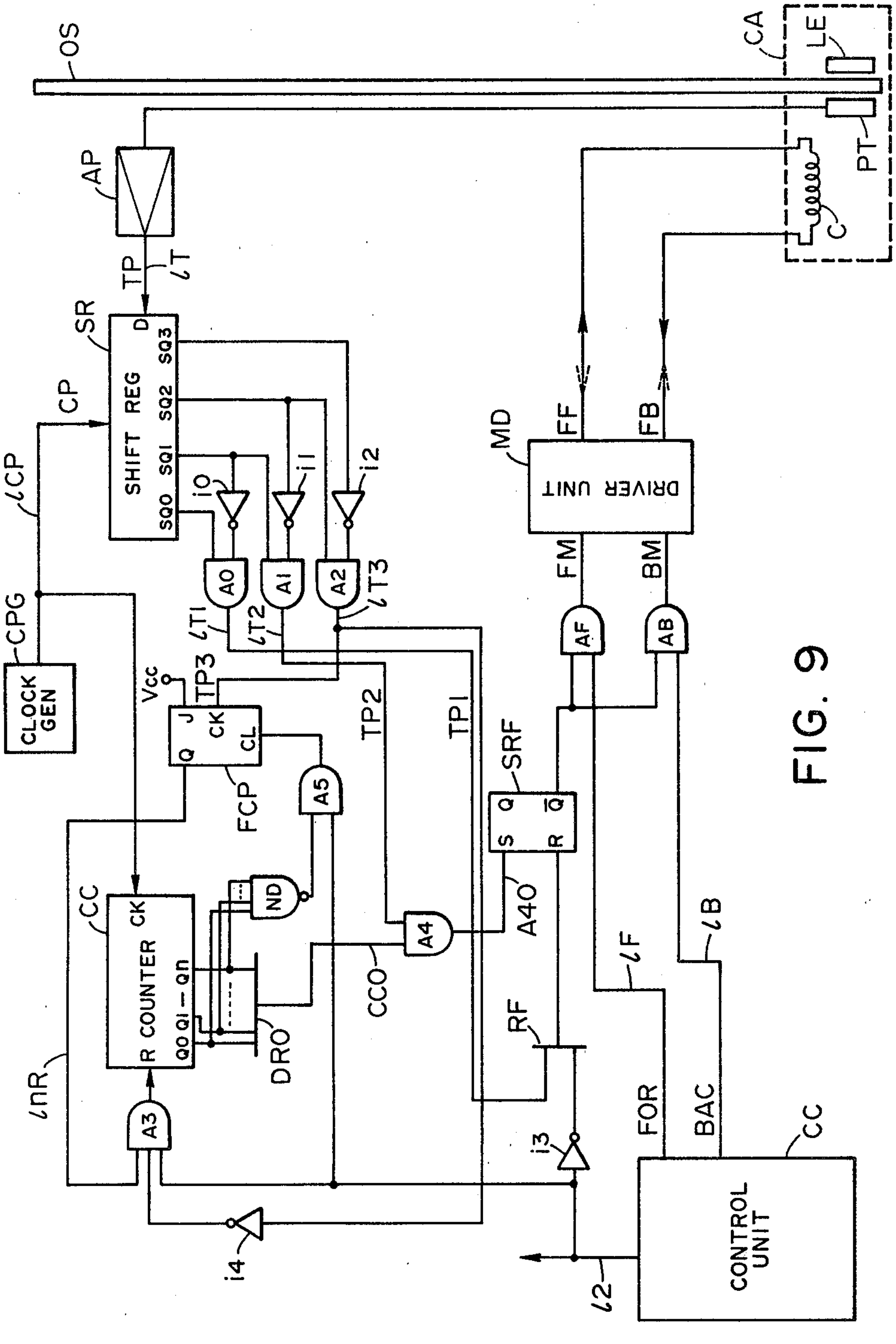
FIG. 9 is schematic diagram of an embodiment of the speed control of the apparatus.
Figure 10:
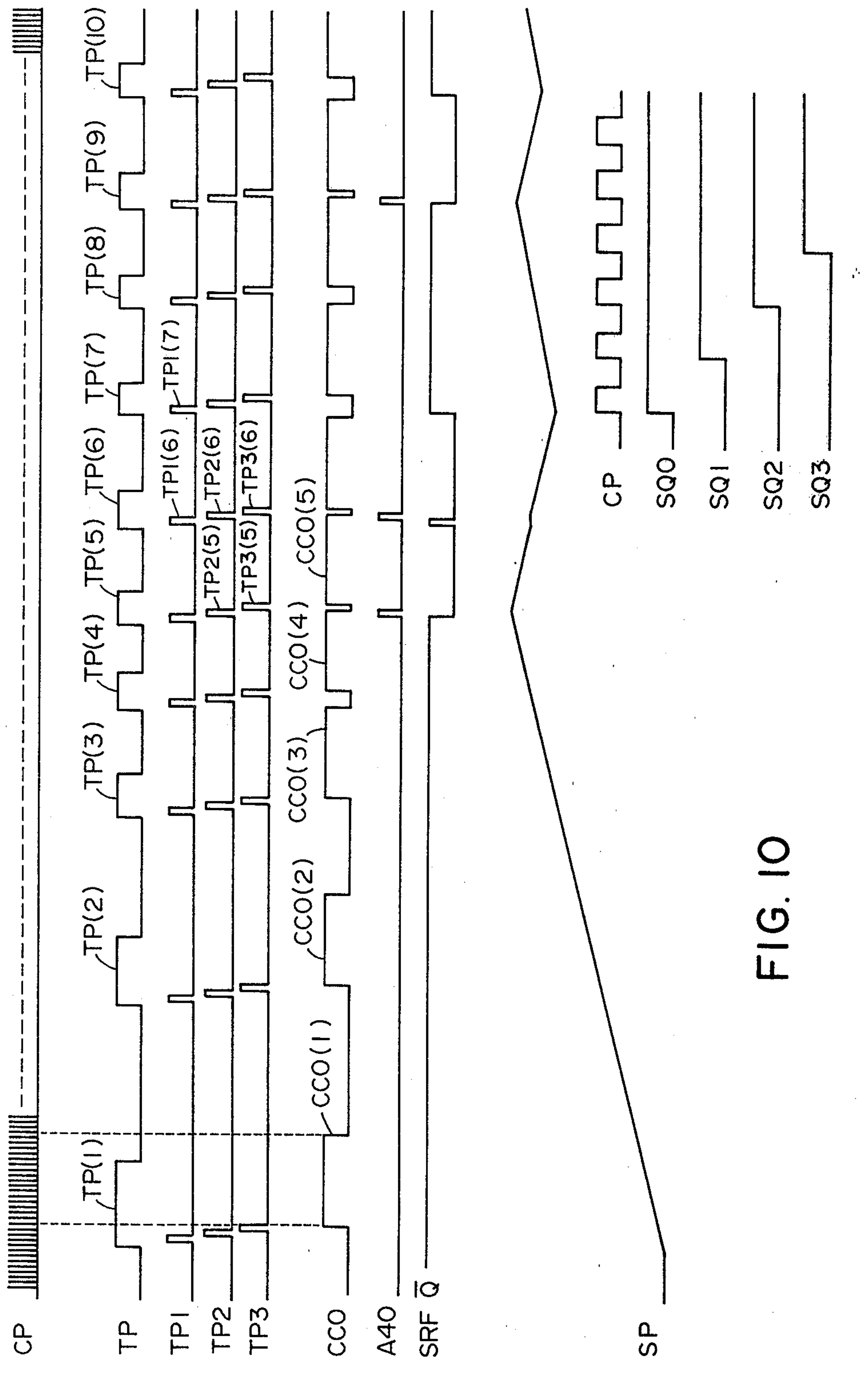
FIG. 10 shows waveforms useful in understanding of the operations of the circuit shown in FIG. 9.

The speed control SC for the carriage CA shown in FIG. 4 is detailedly illustrated in FIG. 9, of which the timing chart is also shown in FIG. 10. In response to the carriage advancement caused by the coil C along the slit plate OS, the detecting means LE, PT produce optically detected signals which are supplied, after amplified by the amplifier AP, as timing pulses TP on the signal line lT as already explained in the foregoing.

In response to timing pulses TP, the output ports Q0, Q1, Q2 and Q3 of a 4-bit shift register SR are set in succession, corresponding to the clock pulses CP from the clock pulse generator CPG. An AND gate A0 develops an output signal TP1, corresponding to the logical AND of the signal Q1 inverted by an inverter i0 and the signal Q0, to a signal line lT1. An AND gate A1 produces an output signal TP2, corresponding to the logical AND of the signal Q2 inverted by an inverter i1 and the signal Q1, to a signal line lT2. Similarly an output signal TP3, corresponding to the logical AND of the signal Q3 inverted by an inverter i2 and the signal Q2, is supplied to a signal line lT3, signals TP1–TP3 being shown in FIG. 10. The signal TP1 on the line lT1 resets a flip-flop SRF through an OR gate RF, while the signal TP2 on the line lT2 is introduced to an AND gate A4 to enable a gate A4 for the duration of signal TP2.

Also the signal TP3 on the line lT3 sets a flip-flop FCP to produce a "1" level signal to an AND gate A3, and is also utilized for resetting through an inverter for the duration of the signal, after which the resetting is cancelled to allow entry of the clock pulses CP from the line lCP into a counter CCH.

The counter CCH is reset through the gate A3 at the start of printing operation by the "0" level state of the signal line l2 for the determined period, while the flip-flop FCP is reset through the gate A5, whereby the flip-flop FCP supplies a "0" level signal to the gate A3 on a signal line lnR to continuously reset the counter CCH until it is set by the signal TP3. Flip-flop FCP is maintained in its set state until it is reset, through a NAND gate ND, by the "1" level state of all the outputs Q0–Qn of the counter CCH at the completion of counting operation thereof. Consequently the counter CCH is reset only in two occasions, i.e. when reset by the signal TP3 or when reset by the resetting of the flip-flop FCP by the "0" level signal from the NAND gate ND upon completion of the counting up to n by counter CCH.

Also at the start of the printing operation, a flip-flop SRF is reset by the line l2 signal and through an inverter i3 and an OR gate RF, thus to enable AND gates AF and AB. Now referring further to FIG. 10, and in response to a timing pulse TP(1) there are generated pulse signals TP1, TP2 and TP3, whereby the flip-flop FCP is shifted to its set state. Upon discharge from the resetting by $\overline{TP3}$, the counter CCH initiates the counting of clock pulses CP up to a number n, giving output signals to the terminals Q0–Qn. During the counting operation an OR gate OR0 produces a "1" level signal on a line CCO to the AND gate A4.

AND gate A4 receives, at the other input terminal thereof, the signal TP2 which is generated in response to the timing pulse TP generated by the movement of the carriage as explained in the foregoing and thus having a timing and a duration dependent on the carriage speed. Thus, in the case of a low carriage speed as represented by the timing pulse TP(1) in FIG. 10, the signal TP2 is not produced before the completion of the counting operation by the counter CCH to maintain the gate A4 in its disabled state, whereby the flip-flop SRF remains in its reset state achieved by the resetting, through the OR gate RF, by the signal TP1 produced prior to signal TP2. The carriage drive is therefore continued since the gates AF, AB are not affected in this state.

Also in response to the succeeding timing pulses TP(2), TP(3) and TP(4) the coil drive is not altered as the AND gate A4 does not generate the logical AND of the counter output signal over the line CCO and the signal TP2, but the interval between the timing pulses becomes gradually shorter because of the increasing carriage speed. Thus, in response to the pulse TP(5), the AND gate A4 produces the logical AND signal of the output signal CCO(4) from the counter CCH through the gate OR0 and the signal TP2(5), thus setting the flip-flop SRF through a signal line A40.

Upon the setting the output $\overline{Q}$ of the flip-flop SRF is shifted from its "1" to "0" level to disable the AND gates AF, AB through signal lines FM and FB, thereby deactivating the driver unit MD and terminating the energization of the coil C. Even after the terminating the carriage continues to move due to its inertia, though with a gradually decreasing speed. In response to the succeeding timing pulse TP(6), there is generated the signal TP1(6) for resetting the flip-flop SRF through the gate RF, whereby the gates AF, AB are re-energized by the output signal $\overline{Q}$ to restart the coil drive. On the other hand the counter CCH restarts the counting after it is reset by the signal TP3(5).

Although the coil drive is interrupted from the signal TP2(5) to the signal TP1(6), the carriage speed is still high at the timing pulse TP(6) shown in FIG. 10, so that the gate A4 develops the logical AND of the signal CCO(5) from the counter CCH and the signal TP2(6), in a similar manner to the case of timing pulse TP(5), to again set the flip-flop SRF thereby disabling the gates AF, AB and thus interrupting the coil drive until the signal TP1(7) generated in response to the timing pulse TP(7) is received.

Then, in a similar manner, the signal TP1(7) corresponding to the succeeding timing pulse TP(7) resets the flip-flop SRF through the gate RF to enable the gates AF, AB thereby restarting the coil drive. The resetting and counting operation of the counter CCH are repeated in a similar manner.

Thereafter the coil drive is controlled by the logical AND signal of the signal TP2 and the output signal CCO from the counter CCH, thus not interrupting the coil drive in response to the timing pulses TP(7) and TP(8) but interrupting the coil drive in response to the pulse TP(9) as in the case of TP(5) and TP(6), thus achieving the speed control of the carriage CA based upon the n count of clock pulses by the counter CCH.

Although in the foregoing embodiment the printing operation is effected only in one direction of the carriage movement, the present invention enables the printing operation to be effected both in the forward and backward movements of the carriage in order to improve the printing speed, with suitable correction of distortion in print position caused in bidirectional printing.

Figure 11:
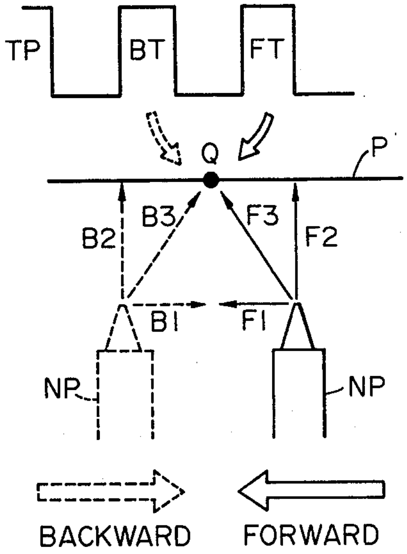
FIG. 11 is a schematic view showing the principle of two-directional printing.
Figure 12:
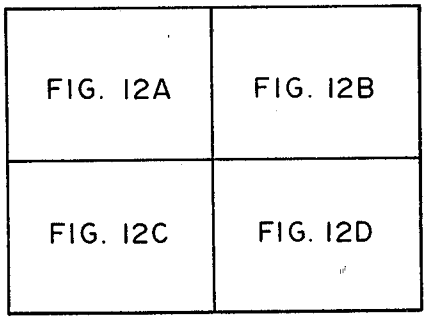
FIGS. 12A–12D, when combined as shown in FIG. 12, are a schematic block diagram showing an embodiment of the circuit of the apparatus.
Figure 14:
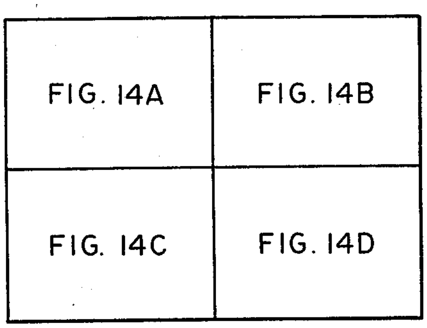
FIGS. 14A–14D, when combined as shown in FIG. 14, are a schematic block diagram showing another embodiment of the circuit of the apparatus.
Figure 12A:
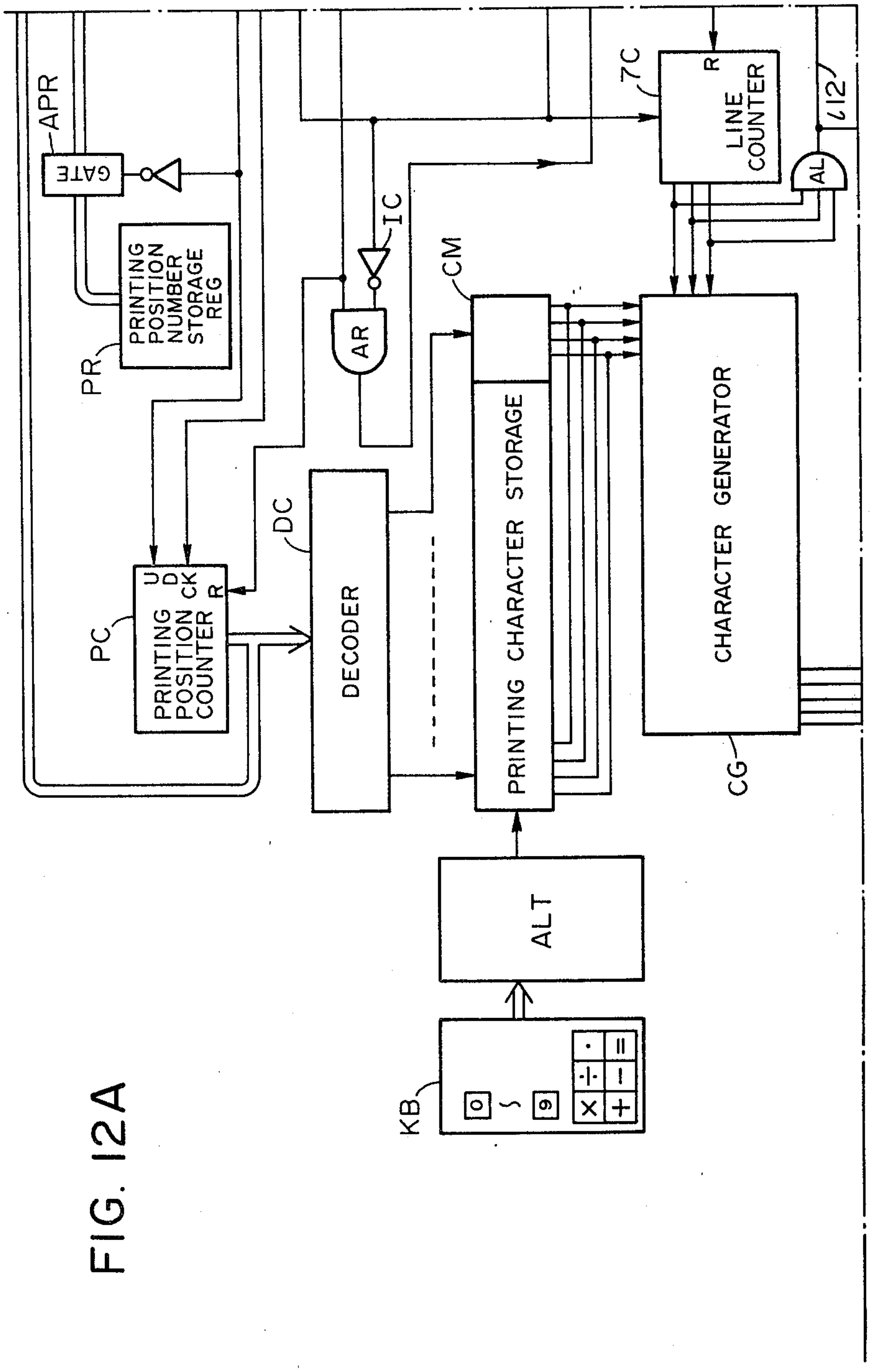
Figure 12B:
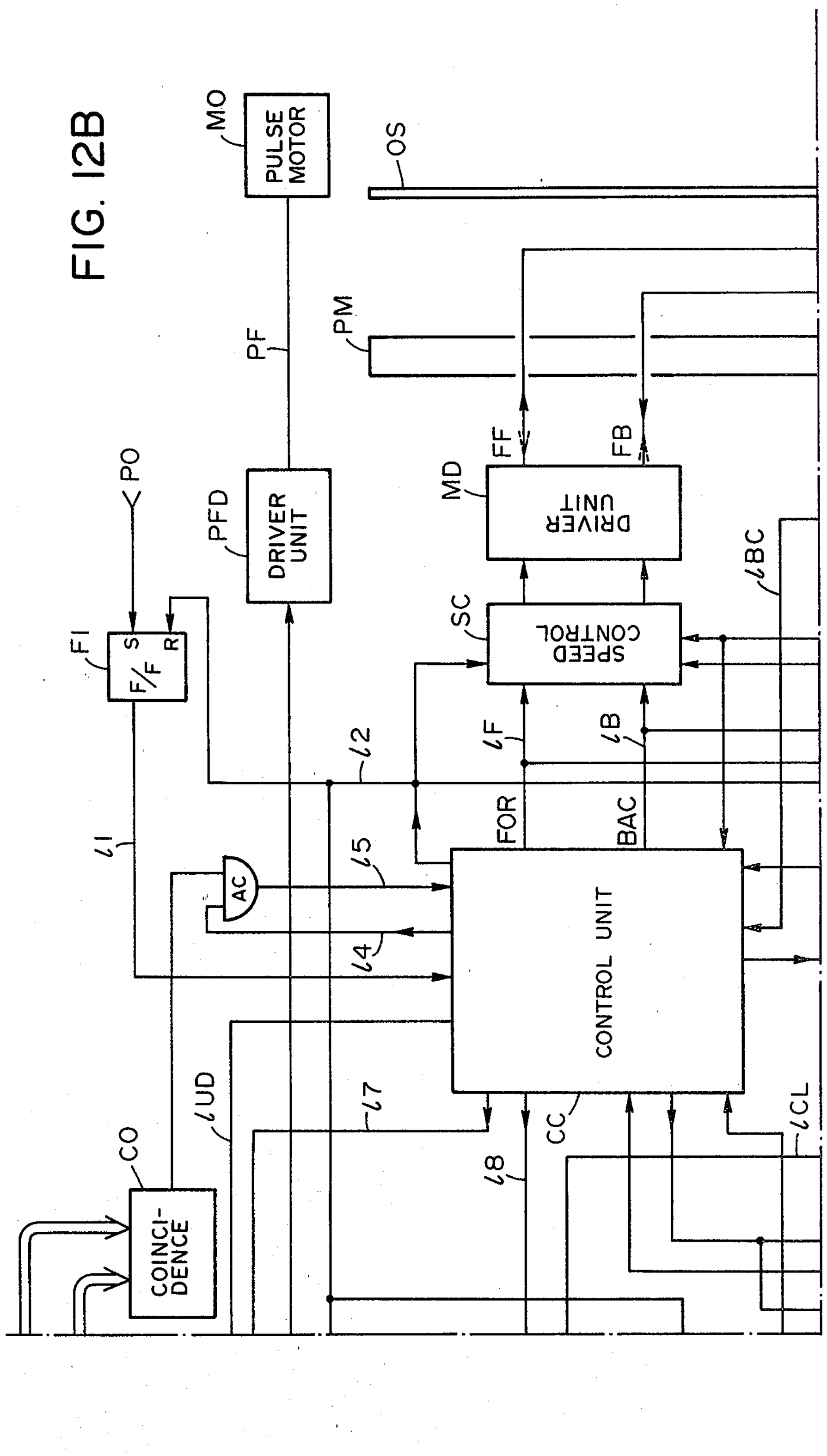
Figure 12C:
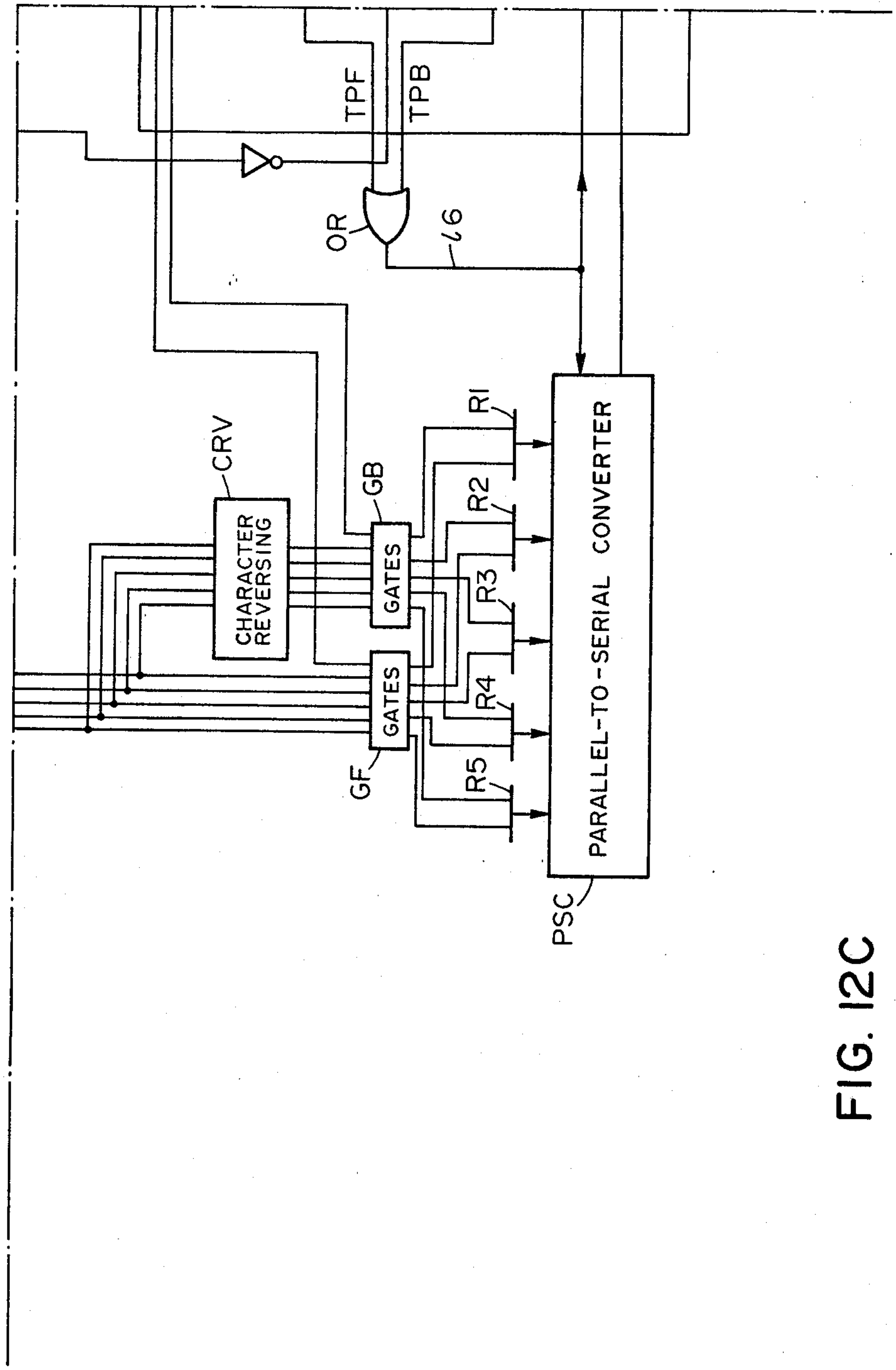
Figure 12D:
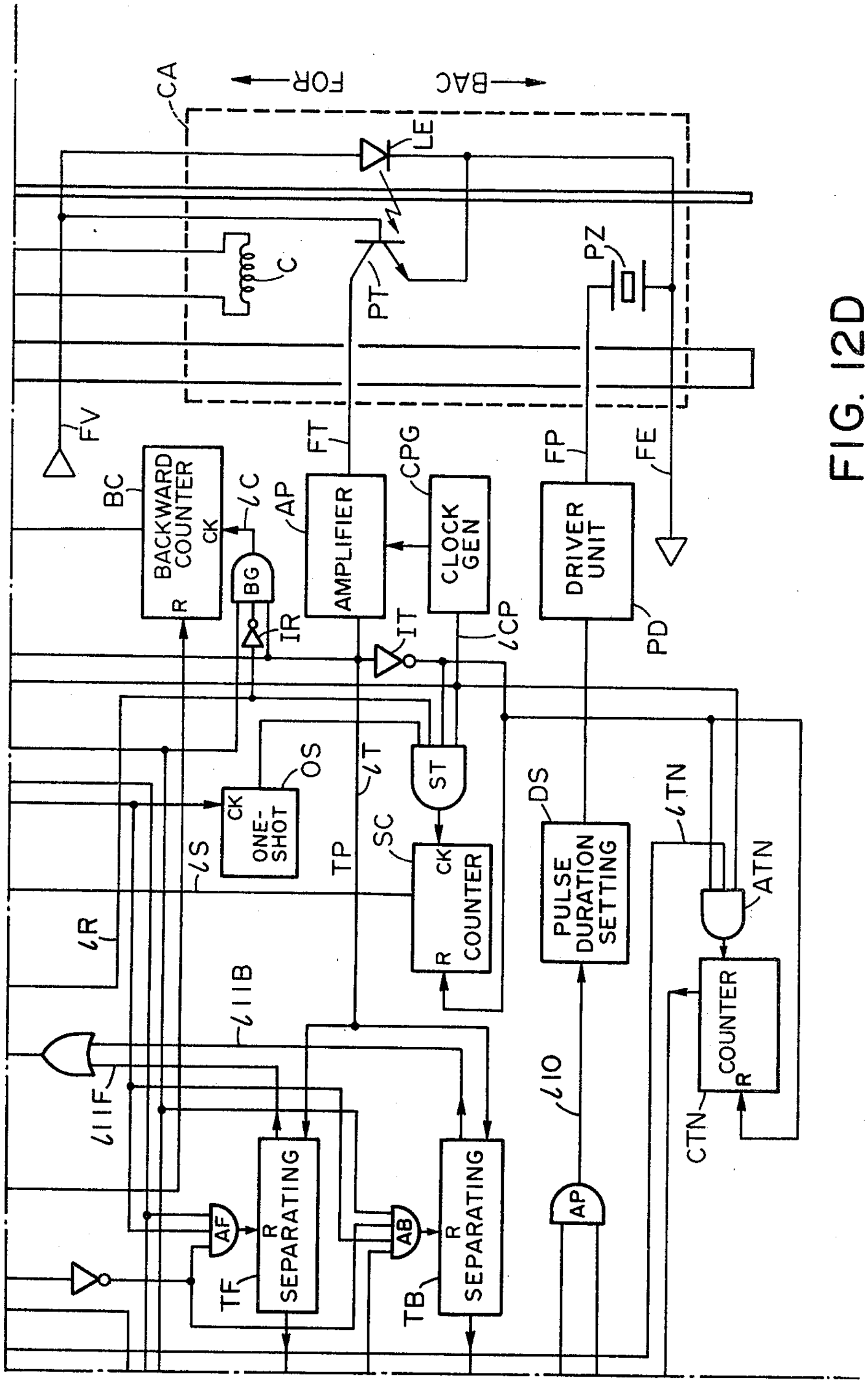

Now reference is made to FIG. 11. In the forward printing, because of the speed F1 of the ink jet nozzle head NP and of the speed F2 of an emitted ink droplet, a droplet for printing is emitted in a direction and speed represented by F3 as synthesized from F1 and F2, whereby the printing position on the paper P is different from the position of an ink droplet emitted. Thus, in the case of printing only in the forward or backward direction there will result no distortion in printing as long as ink emission is effected at constant timing. In the case of two-directional printing, however, the characters printed in the backward printing will become displaced from those which would be printed in the forward printing if the former were printed at the same timing as the latter, since the nozzle NP' in the backward movement emits a droplet in a direction B3 resultant from composition of the nozzle speed B1 and the ink droplet speed B2.

Figure 13:
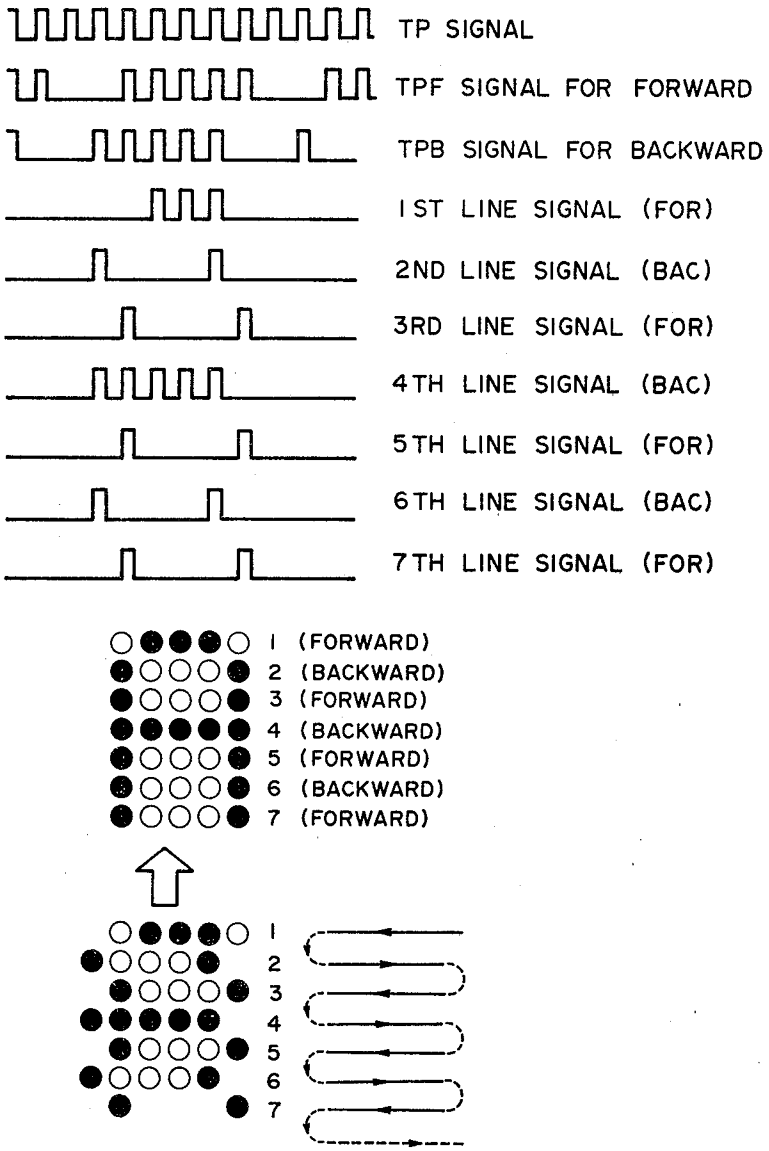
FIG. 13 is a chart useful for understanding the operations of the circuit shown in FIGS. 12A–12D.
Figure 14A:
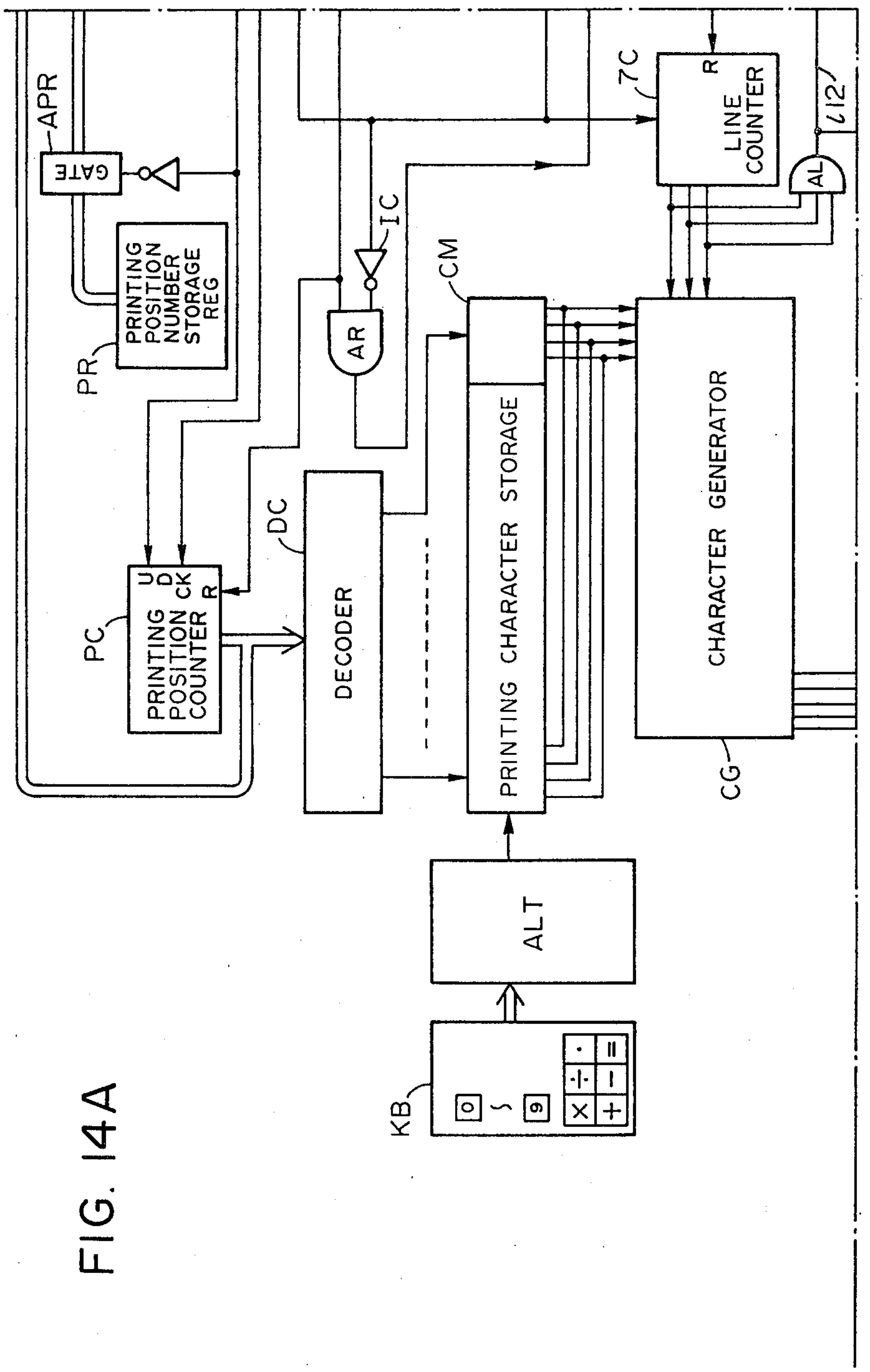
Figure 14B:
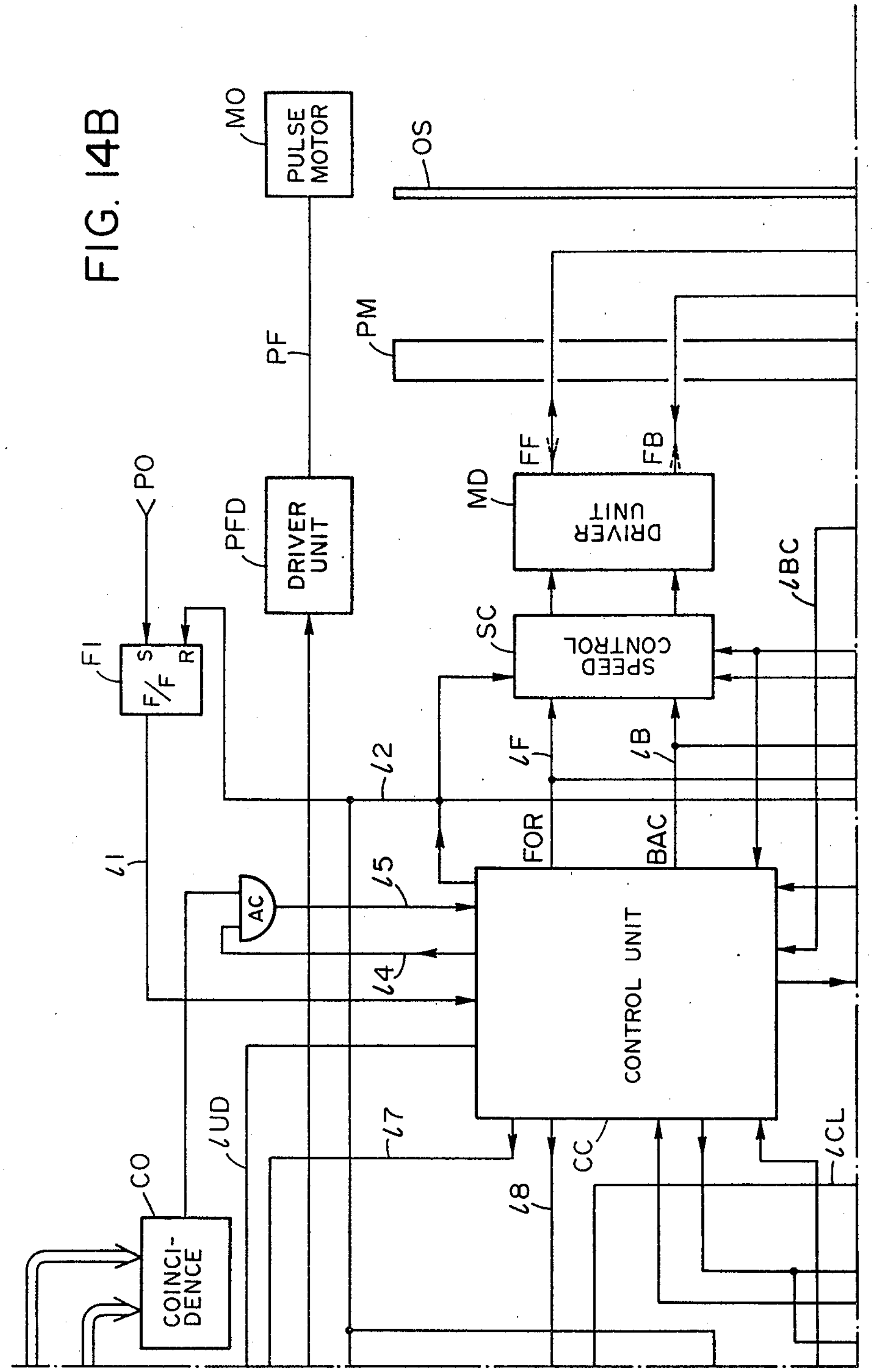
Figure 14C:
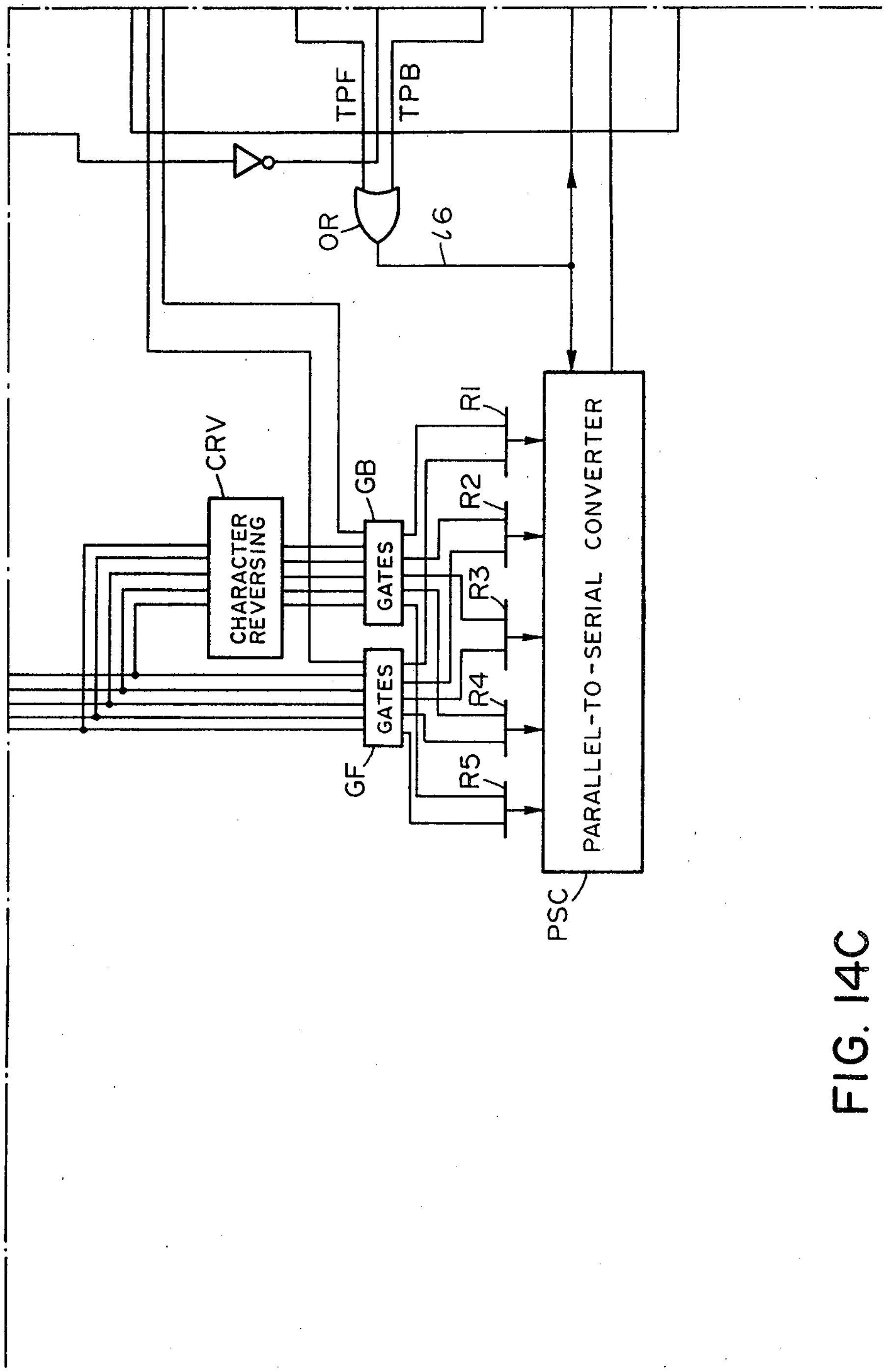
Figure 14D:
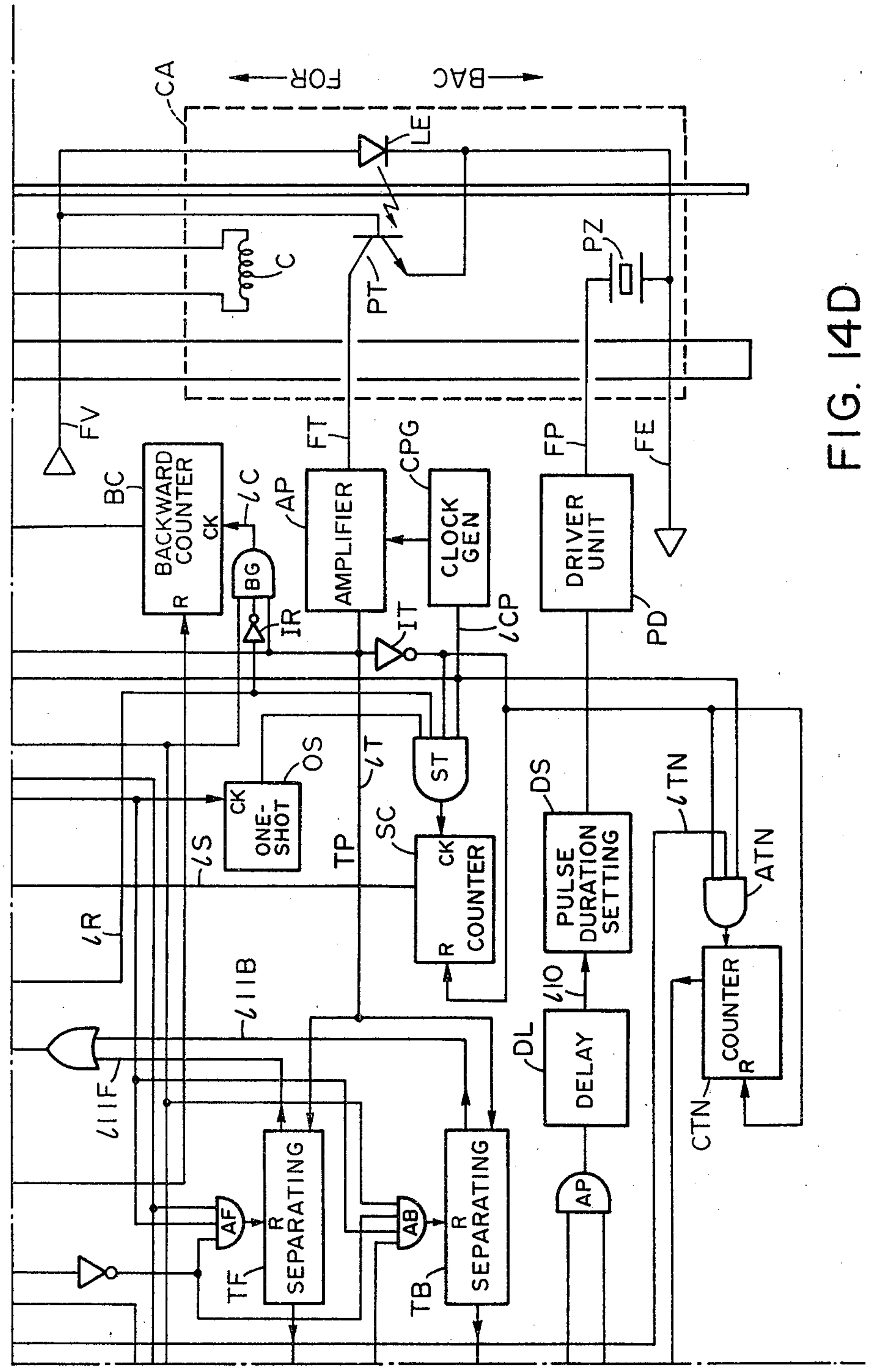

As shown in FIG. 13, the relative displacement of adjacent rows of an alphanumeric character results in distortion of the resultant character.

In accordance with the present invention such distortion is prevented by advancing the print timing in the backward printing with respect to that in the forward printing.

In the following embodiment, an immediately preceding timing is utilized as the timing for droplet emission in the backward printing.

In the circuit shown in FIGS. 12A–12D, upon setting of the flip-flop 1 in response to a printing command signal, the control unit CC, through the signal line l2 as explained in the foregoing, resets the printing position counter PC, line counter 7C, speed control SC, flip-flop F1, a forward timing pulse separating circuit, a backward timing pulse separating circuit and backward counter BC, and shifts the level of signal line lTN to its "0" level.

Then the coincidence circuit CO compares the contents of the printing position counter PC with the printing position register PR, and in response to the absence of coincidence identified through the gate AC enabled by the line l4, signal the control unit CC shifts the levels of signal lines lF, lB respectively to "1" and "0" levels thereof to cause the forward movement of the carriage CA by the driver MD. Along with the carriage movement there are generated timing pulses TP as explained in the foregoing, which are supplied to timing pulse separating circuits TF, TB. Circuits TF, TB, controlled by signal lines lF, lB through gates Af, Ab, are respectively in the operational and reset states thereof by lF=1 and lB=0, whereby the output signal from separating circuit TF is supplied through an OR gate OR to a signal line l6.

The printing positions in a printing line are stored in advance in the printing position register PR, and the characters to be printed are produced, in response to the selection of the print character storage CM by the print position counter OC through the decoder. Thus produced data are converted in the character generator CG under the control of the line counter 7C into 5-bit printing signals which are supplied to the parallel-to-serial converting circuit PSC. A character reversing circuit CRB required in the backward printing is constantly operational but the data selection is controlled by AND gate groups GF and GB. The group of gates GF is enabled by the signal line lF signal during the forward carriage transfer while the group of gates GB is enabled by the line lB signal during the backward carriage movement to transmit the data through character reversing circuit CRV and through OR gates R1-R5 to the parallel-to-serial converting circuit PSC, whereby the printing signals are supplied to the line l10 in the timing of 5-pulse signals TPF or TPB supplied on the line l6. Now, in the case of the forward printing, the data are provided without passing through the character reversing circuit CRV. The output signals from the parallel-to-serial converting circuit PSC are supplied, through an AND gate AP to be enabled by the line l6 signal only during the high-level period of the timing pulse and through the line l10 signal, to the pulse duration setting circuit DS, which in turn generates the pulses of a determined duration to activate the piezoelectric device PZ through the driver FP, thus achieving the printing.

In the foregoing there has been explained the 5-dot printing in the first line of 7 lines constituting a 5×7-dot matrix obtained from the character generator corresponding to the first printing position in the first printing line.

Upon completion of 5-dot printing for the first line in the first printing position, which is identified through a line l11F, the control unit CC increments the print position counter 7C through a line l7. Again there is conducted the comparison of the contents of the print position register PR and of the print position counter PC, and in response to the absence of coincidence identified through the signal line l5, the control unit CC reads a character from the memory corresponding to the incremental content of the printing position counter PC and executes the printing in response to the 5-pulse signals from the timing pulse separating circuit TF.

The above-explained procedure of incrementary the printing position counter, memory readout and signal entry to the parallel-to-serial converting circuit can be sufficiently executed before the 5-pulse signals since the system clock signals of the circuit are sufficiently faster in rate than the timing pulses.

In this manner 5-dot groups constituting the first line in 5×7-dot matrices of the first printing line are printed in the forward direction.

As an example, in the case of printing the letter "A", the 1st, 3rd, 5th and 7th lines in a 5×7-dot matrix are printed in the forward order at the timing of 5-pulse signals TPF determined by the separating circuit TF. When the coincidence circuit CO identifies the coincidence of the contents of the printing position counter PC and of the printing position register PR in the course of the forward printing, the control unit CC generates a "1" level signal on the line lTN to reset separating circuits TF, TB and enables a gate ATN to allow the entry of the clock pulses from the clock pulse generator CPG into a counter CTN, which performs the counting operation during the passage of the carriage CA on an opaque portion of the slit plate OS and is reset in response to the signal $\overline{TP}$ corresponding to the passage of the carriage CA over a translucent SS of the slit plate OS. Consequently the full-count capacity of counter CTN is selected larger than the number of clock pulses to be counted between two adjacent translucent slots and so as to produce an output signal in the vicinity of the position TN shown in FIG. 3. In this manner, after passing through the final character slits LCS shown in FIG. 3, the carriage disregards the approach slits AS and moves to a position TNF. In response to the output from the counter CTN, the control unit CC shifts the level of line lTN to its "0" level thereby inhibiting the input to the counter CTN and enabling the separating circuits TF, TB. Then the motor drive is terminated due to the "0" level state of the line lF signal, and the paper feed driver PFD is activated by the line l8 signal to effect the paper feeding. Also the counter 7C is incremented, and a signal level on line lUD is set at its "1" level in case the output signal from the gate AL is at its "0" level to select the down counting in the print position counter PC which is composed of an updown counter, and to disable a gate APR through an inverter thereby introducing a zero content of the printing position register PR into the coincidence circuit. Upon detection of the absence, in this case, of coincidence detected through the line l5 in response to a command signal supplied on the line l4, the control unit CC shifts the line lB signal to its "1" level to cause the backward carriage transfer by the driver MD. Timing pulses TP are obtained from the detectors LE, PT in the similar manner to the forward movement. In such backward printing, the separating circuit TF remains unoperative because of lF=0 and lB=1 while the separating circuit TB is rendered operative, whereby the timing pulses TPB are supplied through the OR gate OR and line l6 to the parallel-to-serial converting circuit PSC. The characters to be printed are produced, as in the case of forward printing, from the print character storage CM in response to the selection by the printing position counter PC and through the decoder DC, and the selected data are converted into 5-bit printing signals in the character generator under the control of the incremental content of the counter 7C and at the timing of 5-pulse signals TPB separated in the separating circuit TB. In this case the output signals from the character generator CG are supplied through the character reversing circuit CRV and through the AND gate group GB enabled by the line lB to parallel-to-serial converting circuit PSC. Then, in a similar manner to the forward printing, the pulse duration setting circuit DS produces the pulses of a determined duration to activate the piezoelectric device through the driver PD, thus achieving the printing in the backward direction.

In the present embodiment, the 5-pulse signals TPB developed from the separating circuit TB are offset in timing, as shown in FIG. 13, at least by one pulse interval from the 5-pulse signals TPF for the forward printing, in order to avoid distortion or aberration in printed positions observed in case the pulse timing for the backward printing is coincident with that of the forward printing. In accordance with the present embodiment a symmetrical slit is employed, and the timing pulses TPB of a 5-pulse group for the backward printing are advanced by one pulse interval with respect to the timing pulses TPF for the forward printing to achieve the printing without undesirable distortion in printing.

Also such advancement in pulse timing is not limited to the above-mentioned one pulse interval but can be a plurality of pulse intervals such as 2 or 4 pulse intervals. In this manner, in the backward printing the print signals are produced at timings advanced by one pulse interval from those for the forward printing, thus obtaining the ink emission and the printing results on the printing paper as shown in FIG. 13, wherein the first line is printed in the forward direction while the second line in the 5×7-dot matrix is printed in the backward direction, and so on.

After developing 5-pulse print signals, the control unit CC produces a signal on the line l7 in response to which the content of the printing position counter PC is decremented as it is in the down-counting mode. The printing of the succeeding position of character is conducted after confirming the absence of coincidence.

For example in the case of printing the letter "A" as shown in FIG. 13, the backward printing is conducted in the 2nd, 4th and 6th lines of 5×7-dot matrix with the above-mentioned timing of the timing pulses. In the course of such backward printing, when the coincidence circuit CO identifies the coincidence of the contents of the printing position counter PC and the printing position register PR, the control circuit CC shifts the line lTN signal level to its "1" level as in forward printing to reset the separating circuits TF, TB and to enable the gate ATN. Upon identification of the arrival of carriage at the position TNB outside the slit area, by means of the output from the counter CTN, the control unit CC shifts the level of line lTN signal level to its "0" level to inhibit the input into the counter CTN and enables the separating circuits TF, TB. Also the line lB signal is shifted to its "0" level to terminate the carriage movement in the backward direction, and the control unit CC energizes the driver PFD through the line l8 to effect the paper feed, increments the counter 7C, shifts the print position counter PC to its up-counting mode through the line lUD and enables the gate APR to introduce the content of the printing position register PR into the coincidence circuit CD. Thereafter the printing is executed up to the 7th line of 5×7-dot matrices in the similar operation to what has been explained in the foregoing. Upon paper feeding and increment of the counter 7C after the completion of printing of the 7th line, the counter 7C produces a "1" level signal through the gate AL on the line l12, in response to which the control unit CC shifts the line lB signal to its "1" level to cause backward carriage advancement by the driver MD. In this state the separating circuit TB is in its reset state due to the reset input through the inverter of l12=1. In the backward displacement after the printing of the 7th line, the control unit CC checks the state of the line l1 and returns the carriage to the position HB by means of the backward counter BC in the case of continued printing or to the position HO at the turning on of the power supply in case the printing operation is completed. The printing operation is completed after paper feeding by an interline spacing.

In the foregoing explanation it is assumed that the printing timings in the backward printing are advanced by at least one pulse interval from those in the forward printing, but it is also possible to provide a suitable delay time from thus advanced printing timings. In comparison with the foregoing embodiment, in which the print timings are determined by the unit interval of timing pulses, such system utilizing a delay time allows a suitable advance time to be selected and thus to allow stable printing. FIGS. 14A–14D show an embodiment employing such delay circuit DL, of which function will be self-evident and will therefore not be discussed in detail.

What we claim is:

1. Recording apparatus comprising:

linear motor means;

ink jet means for ejecting liquid droplets, said ink jet means adapted for reciprocal movement by said linear motor means; and means for varying the timing of ejection of liquid droplets between the reciprocal movement of said ink jet means in a first direction and the reciprocal movement of said ink jet means in a second direction, wherein said means for varying the timing of ejection of liquid droplets avoids printing distortion in either direction.

2. The recording apparatus according to claim 1, wherein the timing of the ejection of liquid droplets is determined in accordance with a signal generated by a scale plate for detecting the position and speed of said ink jet means.

* * * * *